(12) United States Patent
Kimura et al.

(10) Patent No.: US 10,885,857 B2
(45) Date of Patent: Jan. 5, 2021

(54) LIQUID CRYSTAL DISPLAY DEVICE

(71) Applicant: Japan Display Inc., Minato-ku (JP)

(72) Inventors: Shunichi Kimura, Tokyo (JP);
Toshiharu Matsushima, Tokyo (JP)

(73) Assignee: Japan Display Inc., Minato-ku (JP)

( * ) Notice: Subject to any disclaimer, the term of this patent is extended or adjusted under 35 U.S.C. 154(b) by 286 days.

(21) Appl. No.: 15/955,733

(22) Filed: Apr. 18, 2018

(65) Prior Publication Data

US 2018/0341135 A1    Nov. 29, 2018

(30) Foreign Application Priority Data

May 23, 2017    (JP) .................................. 2017-101906

(51) Int. Cl.
| | | |
|---|---|---|
| *G09G 3/36* | (2006.01) | |
| *G02F 1/1343* | (2006.01) | |
| *G02F 1/133* | (2006.01) | |
| *G02F 1/13357* | (2006.01) | |
| *G09G 3/34* | (2006.01) | |

(52) U.S. Cl.
CPC ............ *G09G 3/36* (2013.01); *G02F 1/1343* (2013.01); *G02F 1/13306* (2013.01); *G02F 1/133602* (2013.01); *G02F 1/134309* (2013.01); *G09G 3/3466* (2013.01); *G02F 1/134363* (2013.01); *G02F 2001/134345* (2013.01); *G02F 2001/134372* (2013.01); *G02F 2201/121* (2013.01); *G02F 2201/123* (2013.01)

(58) Field of Classification Search
CPC ............ G02F 1/1343; G02F 1/134309; G02F 1/134363; G02F 1/13306; G02F 1/133602; G02F 2001/134345; G02F 2001/134372; G02F 2201/121; G02F 2201/123; G09G 3/3466; G09G 3/36
See application file for complete search history.

(56) References Cited

U.S. PATENT DOCUMENTS

| | | | |
|---|---|---|---|
| 8,432,340 B2 | 4/2013 | Okita et al. | |
| 9,575,384 B2 | 2/2017 | Matsushima | |
| 2003/0112257 A1* | 6/2003 | Tamura | ..................... G09G 3/20 |
| | | | 345/690 |
| 2008/0049005 A1* | 2/2008 | Okita | ................... G09G 3/3648 |
| | | | 345/207 |

(Continued)

FOREIGN PATENT DOCUMENTS

| | | |
|---|---|---|
| JP | 2008-40488 | 2/2008 |
| JP | 2015-215493 | 12/2015 |

*Primary Examiner* — William Boddie
*Assistant Examiner* — Saifeldin E Elnafia
(74) *Attorney, Agent, or Firm* — Oblon, McClelland, Maier & Neustadt, L.L.P.

(57) ABSTRACT

According to one embodiment, a first substrate includes a pixel electrode, a common electrode and a sub-pixel area including a first area and a second area. The first area includes an area where the pixel electrode exists, an axial area extending in a second direction, and branch areas extending from the axial area to a first side of the first direction. The second area includes an area where the pixel electrode does not exist, and a first gap area extending in the first direction, at a position between the adjacent branch areas. A maximum value of a first voltage applied to the pixel electrode in a first mode is higher than a maximum value of a second voltage applied to the pixel electrode in a second mode.

16 Claims, 18 Drawing Sheets

(56) References Cited

U.S. PATENT DOCUMENTS

2012/0262452 A1\* 10/2012 Tadao ............... G02B 30/24
　　　　　　　　　　　　　　　　　　　　345/419
2016/0062191 A1\* 3/2016 Matsushima ....... G02F 1/13439
　　　　　　　　　　　　　　　　　　　　349/110

\* cited by examiner

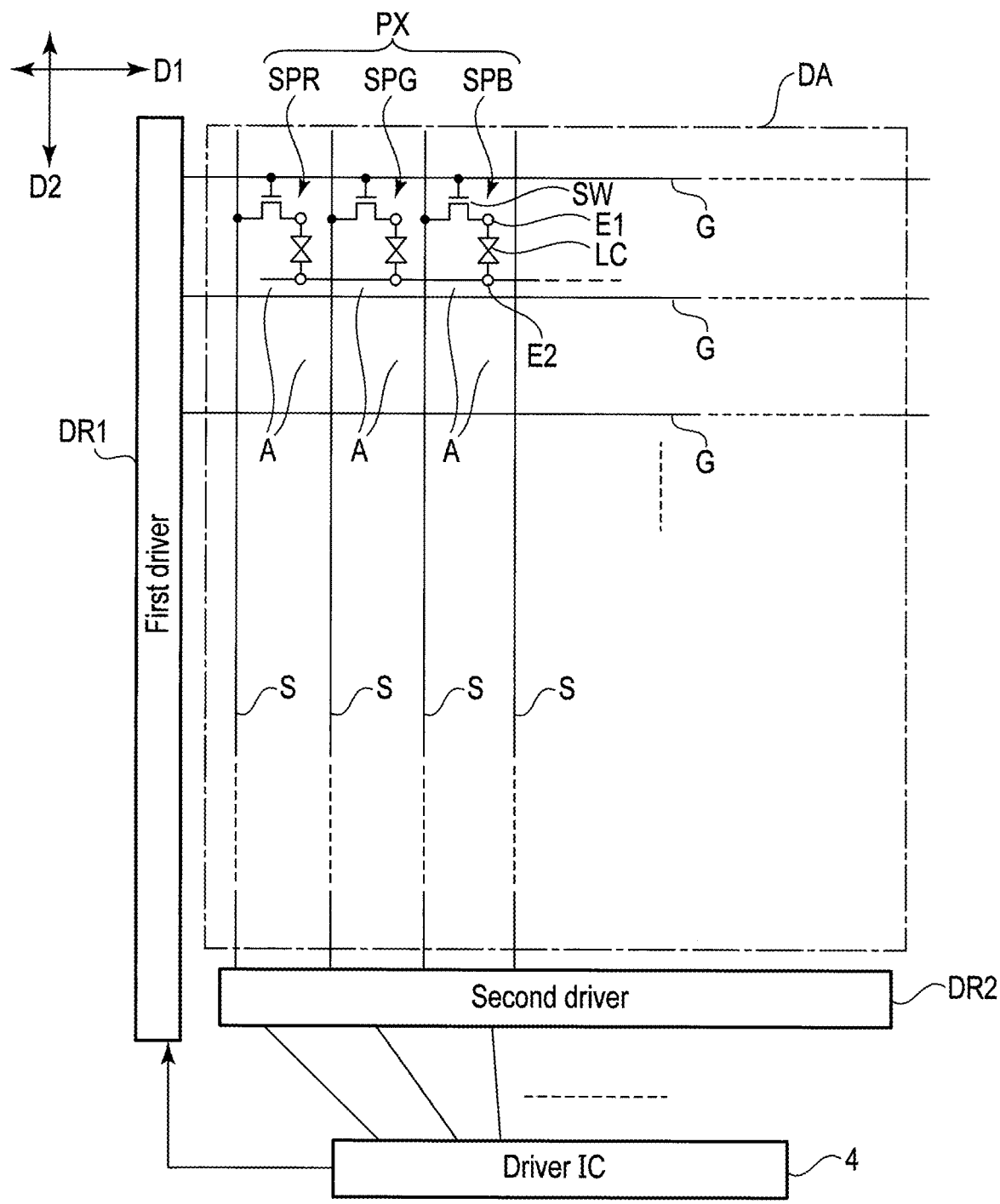
F I G. 2

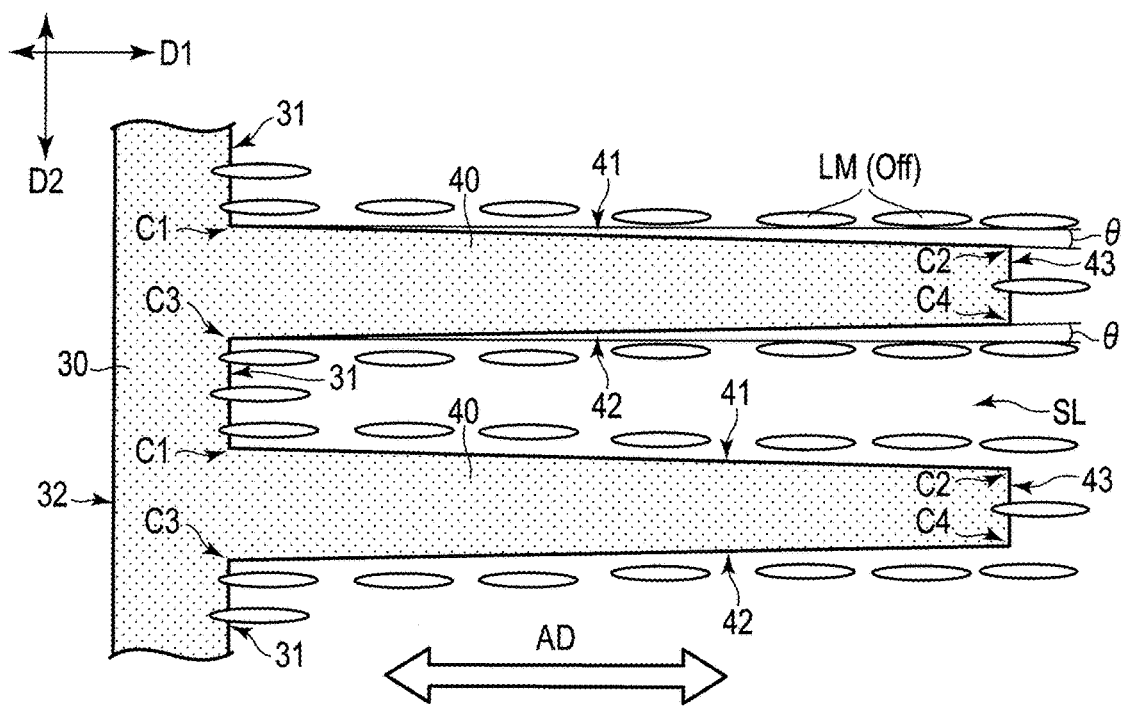
F I G. 5
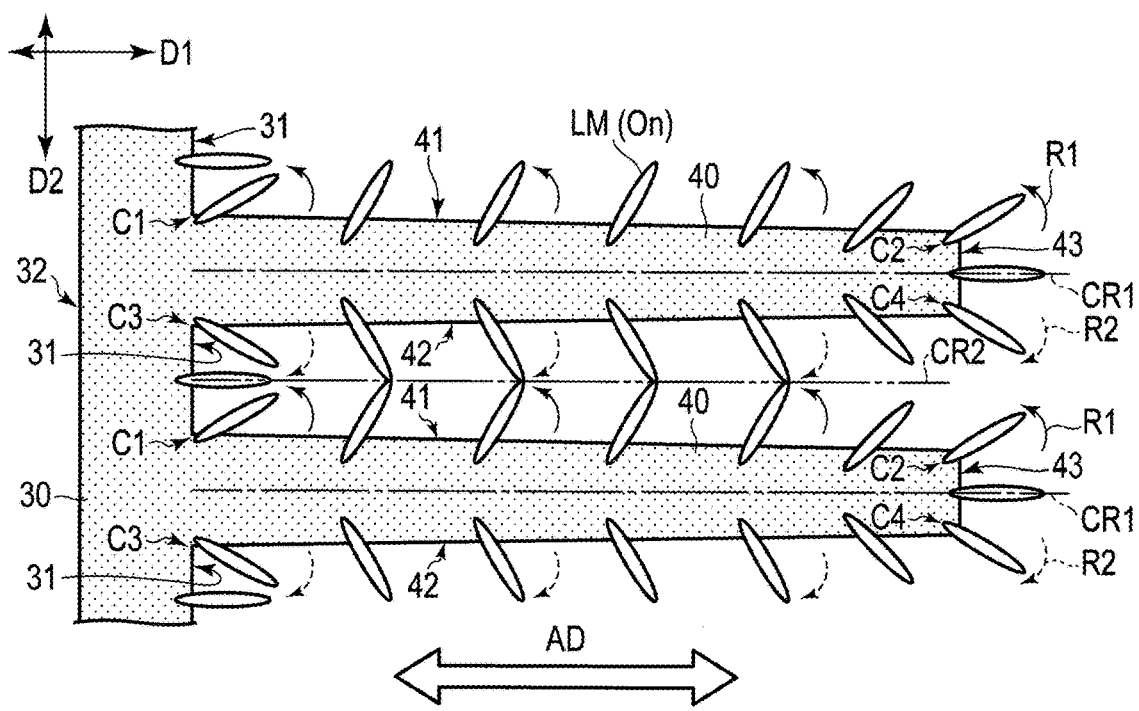
F I G. 6

| Slit pitch (μm) | tr (ms) | tf (ms) |
|---|---|---|
| 7 | 6.50 | 3.75 |
| 6 | 4.95 | 3.00 |
| 5 | 3.95 | 2.45 |
| 4 | 3.00 | 2.00 |

| Cell gap d | Slit pitch 4μm | Slit pitch 5μm |
|---|---|---|
| 2.7 | 7.6 | 7.7 |
| 1.9 | 7.9 | 8.5 |

| Cell gap d | Slit pitch 4μm | Slit pitch 5μm |
|---|---|---|
| 2.7 | 9.2 | 8.5 |
| 1.9 | 9.9 | 10.0 |

Slit pitch: 4 μm, Cell gap d: 2.7 μm, Distal parts of branch area

| Interelectrode distance 2 μm | Interelectrode distance 3 μm |
|---|---|
| 7.7 | 8.0 |

Slit pitch: 4 μm, Cell gap d: 2.7 μm, Proximal parts of branch area

| Interelectrode distance 2 μm | Interelectrode distance 3 μm |
|---|---|
| 8.5 | 7.5 |

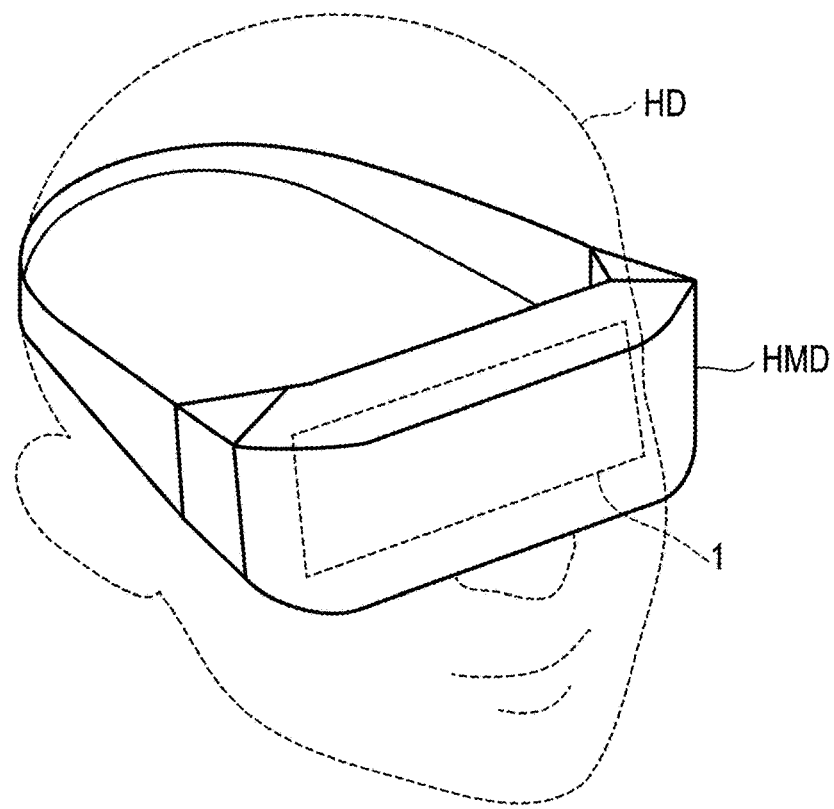
F I G. 27
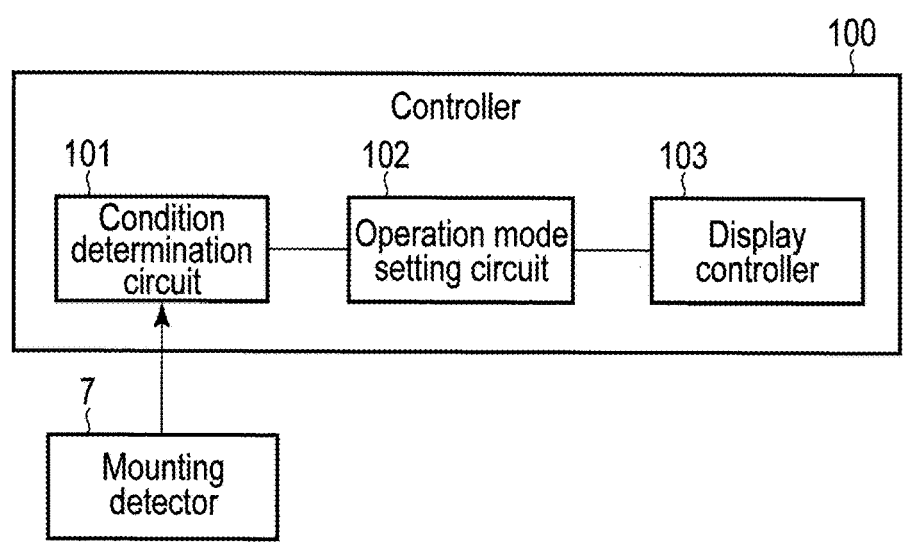
F I G. 28

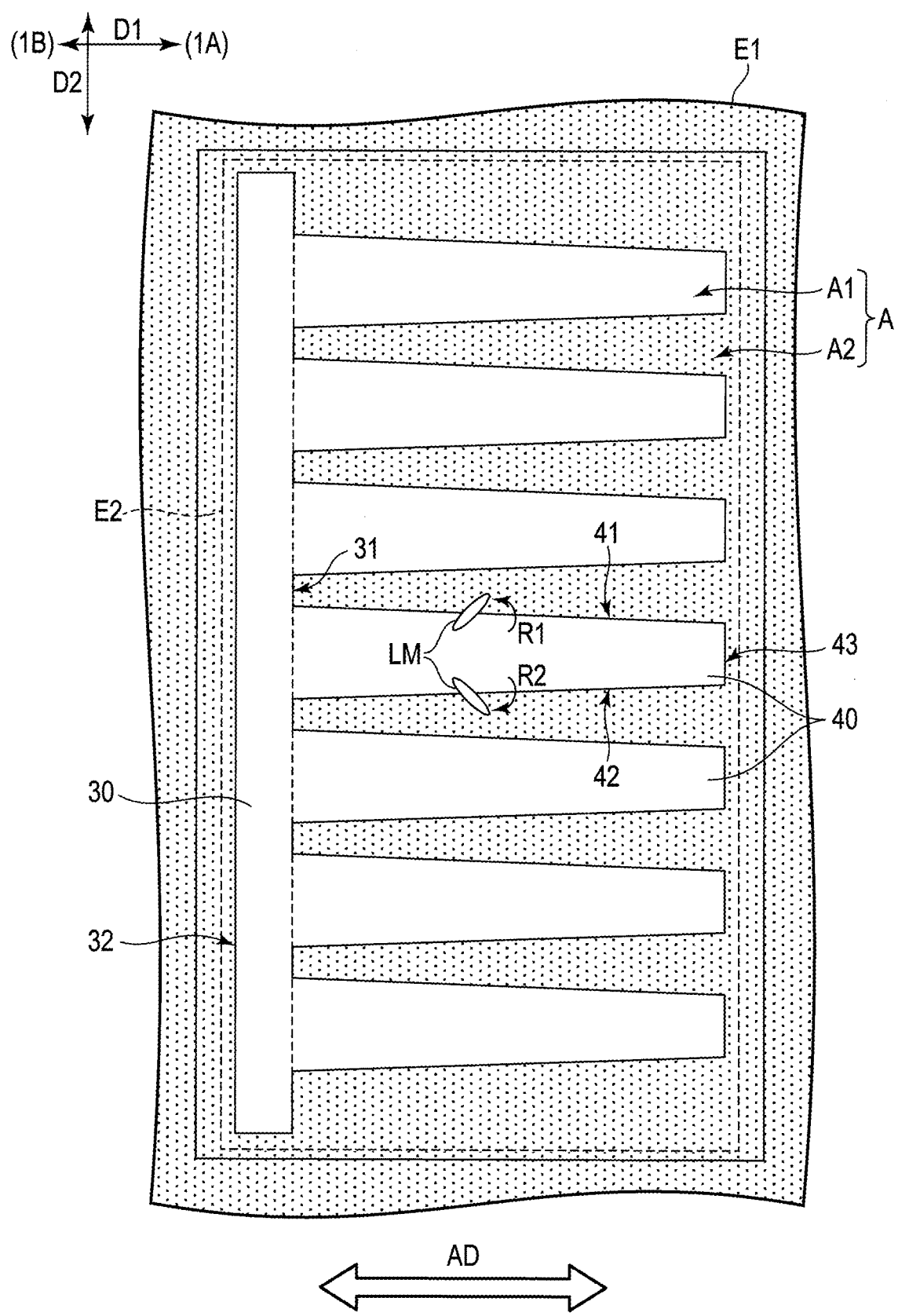
F I G. 30

US 10,885,857 B2

LIQUID CRYSTAL DISPLAY DEVICE

CROSS-REFERENCE TO RELATED APPLICATIONS

This application is based upon and claims the benefit of priority from Japanese Patent Application No. 2017-101906, filed May 23, 2017, the entire contents of which are incorporated herein by reference.

FIELD

Embodiments described herein relate generally to a liquid crystal display device.

BACKGROUND

An in-plane-switching (IPS) mode liquid crystal display device is well known as an example of display devices. In an IPS mode liquid crystal display device, a pixel electrode and a common electrode are provided on one of a pair of substrates opposed via a liquid crystal layer, and a lateral electric field produced between these electrodes is used to control the alignment of the liquid crystal molecules in the liquid crystal layer. In addition, a fringe field switching (FFS) mode liquid crystal display device in which a pixel electrode and a common electrode are arranged in different layers, in the IPS mode, and the alignment of the liquid crystal molecules is controlled by using a fringe electric field produced between the electrodes has been in practical use.

In contrast, a liquid crystal display device in which, for example, pixel electrodes and common electrodes are arranged in different layers, slits are provided in an electrode on a side closer to the liquid crystal layer, and liquid crystal molecules close to both of the sides of the slits in the width direction are rotated in directions opposite to each other has been disclosed. This liquid crystal display device is obviously different in mode from the FFS mode liquid crystal display device, and can increase a response speed and improve alignment stability as compared with the FFS mode. The liquid crystal display device employing this mode is hereinafter called a high-speed response mode liquid crystal display device.

In the high-speed response mode liquid crystal display device, the response speed can be further increased by narrowing intervals of the slits.

If the liquid crystal display device is designed to increase the response speed as mentioned above, however, the transmittance is lowered as compared with the FFS mode or the like.

BRIEF DESCRIPTION OF THE DRAWINGS

FIG. 2 is a diagram showing a schematic equivalent circuit of the liquid crystal display device.

FIG. 5 is an illustration showing an initial alignment state of liquid crystal molecules in the liquid crystal display device.

FIG. 6 is an illustration showing an alignment state of liquid crystal molecules on which an electric field acts.

FIG. 27 is an illustration showing an example of a head-mounted display employing the liquid crystal display device.

FIG. 28 is a block diagram showing a configuration of a liquid crystal display device including a mounting detector.

FIG. 30 is a schematic plan view showing a first electrode.

DETAILED DESCRIPTION

Figure 1:
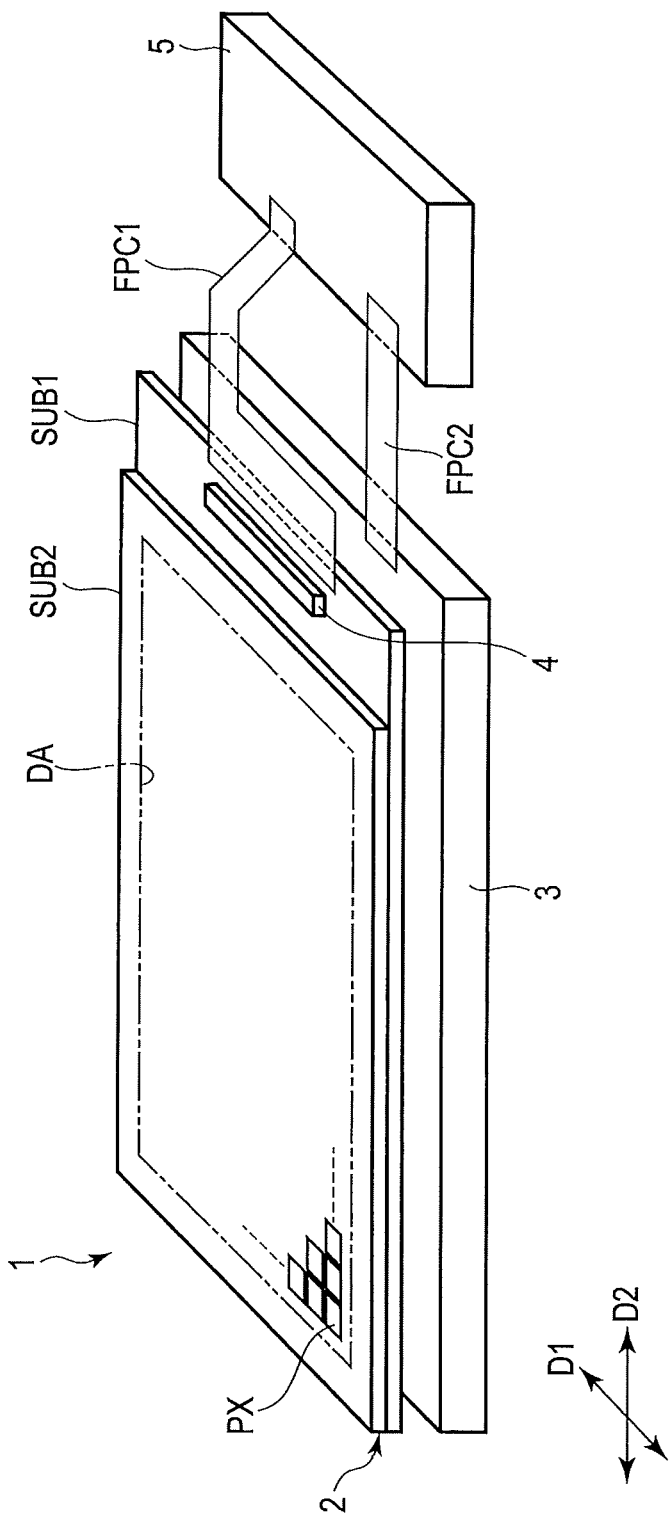
FIG. 1 is a perspective view showing a schematic configuration of the liquid crystal display device according to a first embodiment.

In general, according to one embodiment, a liquid crystal display device includes a first substrate, a second substrate, a liquid crystal layer including liquid crystal molecules disposed between the first substrate and the second substrate, and a controller. The first substrate includes a pixel electrode, a common electrode and a sub-pixel area including a first area and a second area. The common electrode is opposed to the pixel electrode, generates an electric field between the common electrode and the pixel electrode, and rotates the liquid crystal molecules. The first area includes an area where the pixel electrode exists. The second area includes an area where the pixel electrode does not exist. The first area includes an axial area extending in a second direction intersecting a first direction, and branch areas extending from the axial area to a first side of the first direction. The second area includes a first gap area extending in the first direction, at a position between the adjacent branch areas. The controller includes driving modes including a first mode and a second mode. A maximum value of a first voltage applied to the pixel electrode in the first mode is higher than a maximum value of a second voltage applied to the pixel electrode in the second mode.

Various embodiments will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the drawings are illustrated schematically, rather than as an accurate representation of what is implemented. However, such schematic illustration is merely exemplary, and in no way restricts the interpretation of the invention. In the drawings, reference numbers of continuously arranged elements equivalent or similar to each other are omitted in some cases. In addition, in the specification and drawings, the same elements as those described in connection with preceding drawings are denoted by like reference numbers, and detailed description thereof is omitted unless necessary.

A transmissive-type liquid crystal display device is disclosed as an example of the liquid crystal display device in each of the embodiments. However, various embodiments do not prevent application of technical idea disclosed in each of the embodiments to display devices of the other types. As the display devices of the other types, for example, a reflective liquid crystal display device for displaying an image by using external light, a liquid crystal display device including functions of both of the transmissive display device and the reflective display device, and the like are assumed.

In this specification, expressions such as "α includes A, B or C", "α includes any one of A, B and C" and "α is selected from a group consisting of A, B and C" do not exclude a case where α includes combinations of A, B and C unless otherwise specified. Furthermore, these expressions do not exclude a case where α includes other elements.

First Embodiment

FIG. 1 is a perspective view showing a schematic configuration of a liquid crystal display device 1 according to a first embodiment. The liquid crystal display device 1 can be used for, for example, various devices such as a smartphone, a tablet terminal, a mobile telephone terminal, a personal computer, a TV receiver, a vehicle-mounted device, a game console and a wearable terminal.

The liquid crystal display device 1 includes a display panel 2, a backlight 3, a driver IC 4 which drives the display panel 2, a control module 5 which controls operations of the display panel 2 and the backlight 3, and flexible printed circuits FPC1 and FPC2 which transmit control signals to the display panel 2 and the backlight 3.

In the present embodiment, a first direction D1 and a second direction D2 are defined as shown in FIG. 1. The first direction D1 is, for example, a short-side direction of the display panel 2. The second direction D2 is, for example, a long-side direction of the display panel 2. In the embodiment, the first direction D1 and the second direction D2 are perpendicular to each other but may intersect at the other angles.

The display panel 2 includes a first substrate SUB1, a second substrate SUB2 opposed to the first substrate SUB1, and a liquid crystal layer (i.e., a liquid crystal layer LC which will be described later) held between the first substrate SUB1 and the second substrate SUB2. The display panel 2 includes a display area DA (active area) on which an image is displayed. The display panel 2 includes, for example, pixels PX arrayed in a matrix in the first direction D1 and the second direction D2, in the display area DA.

The backlight 3 is opposed to the first substrate SUB1. The driver IC chip 4 is mounted on, for example, the first substrate SUB1. The driver IC 4 may be mounted on the control module 5 or the like. The flexible printed circuit FPC1 makes connection between the first substrate SUB1 and the control module 5. The flexible printed circuit FPC2 makes connection between the backlight 3 and the control module 5.

FIG. 2 shows a schematic equivalent circuit of the liquid crystal display device 1. The liquid crystal display device 1 includes a first driver DR1, a second driver DR2, scanning signal lines G, and video signal lines S. The scanning signal lines G are connected to the first driver DR1. The video signal lines S are connected to the second driver DR2 and intersect the scanning signal lines G.

The scanning signal lines G extend in the first direction D1 and are arranged in the second direction D2, in the display area DA. The video signal lines S extend in the second direction D2 and are arranged in the first direction D1, in the display area DA. The scanning signal lines G and the video signal lines S are formed on the first substrate SUB1.

The liquid crystal display device 1 includes sub-pixel areas A. The sub-pixel areas A are areas sectioned by the scanning signal lines G and the video signal lines S, in planar view from a direction perpendicular to a surface of the first substrate SUB1 (and second substrate SUB2). Sub-pixels SP are formed in each of the sub-pixel areas A. One pixel PX is composed of a plurality of sub-pixels SP. In the present embodiment, it is assumed that one pixel PX includes a sub-pixel SPR displaying a red color, a sub-pixel SPG displaying a green color, and a sub-pixel SPB displaying a blue color. The pixel PX may further include a sub-pixel SP displaying a white color, and the like or may include sub-pixels SP corresponding to the same color.

Each of the sub-pixels SP includes a switching element SW, a first electrode E1, and a second electrode E2 opposed to the first electrode E1. The switching element SW, the first electrode E1, and the second electrode E2 are formed on the first substrate SUB1, similarly to the scanning signal lines G and the video signal lines S. The first electrode E1 is formed in a first layer of the first substrate SUB1, and the second electrode E2 is formed in a second layer of the first substrate SUB1.

In the present embodiment, the first electrode E1 is a pixel electrode and is provided in each sub-pixel SP together with the switching element SW. In addition, in the present embodiment, the second electrode E2 is a common electrode and is formed across the sub-pixels SP. The switching element SW is, for example, a thin-film transistor and is electrically connected to the scanning signal lines G, the video signal line S, and the first electrode E1.

The first driver DR1 sequentially supplies scanning signals to the scanning signal lines G. The second driver DR2 selectively supplies the video signals to the video signal lines S. If the scanning signal is supplied to the scanning signal line G corresponding to a certain switching element SW and the video signal is supplied to the video signal line S connected to this switching element SW, under control of the driver IC 4 to the first driver DR1 and the second driver DR2, a voltage corresponding to the video signal is applied to the first electrode E1. In this case, alignment of the liquid crystal molecules of the liquid crystal layer LC is changed from the initial alignment state in which the voltage is not applied, by the electric field generated between the first electrode E1 and the second electrode E2. An image is displayed in the display area DA by this operation.

Figure 3:
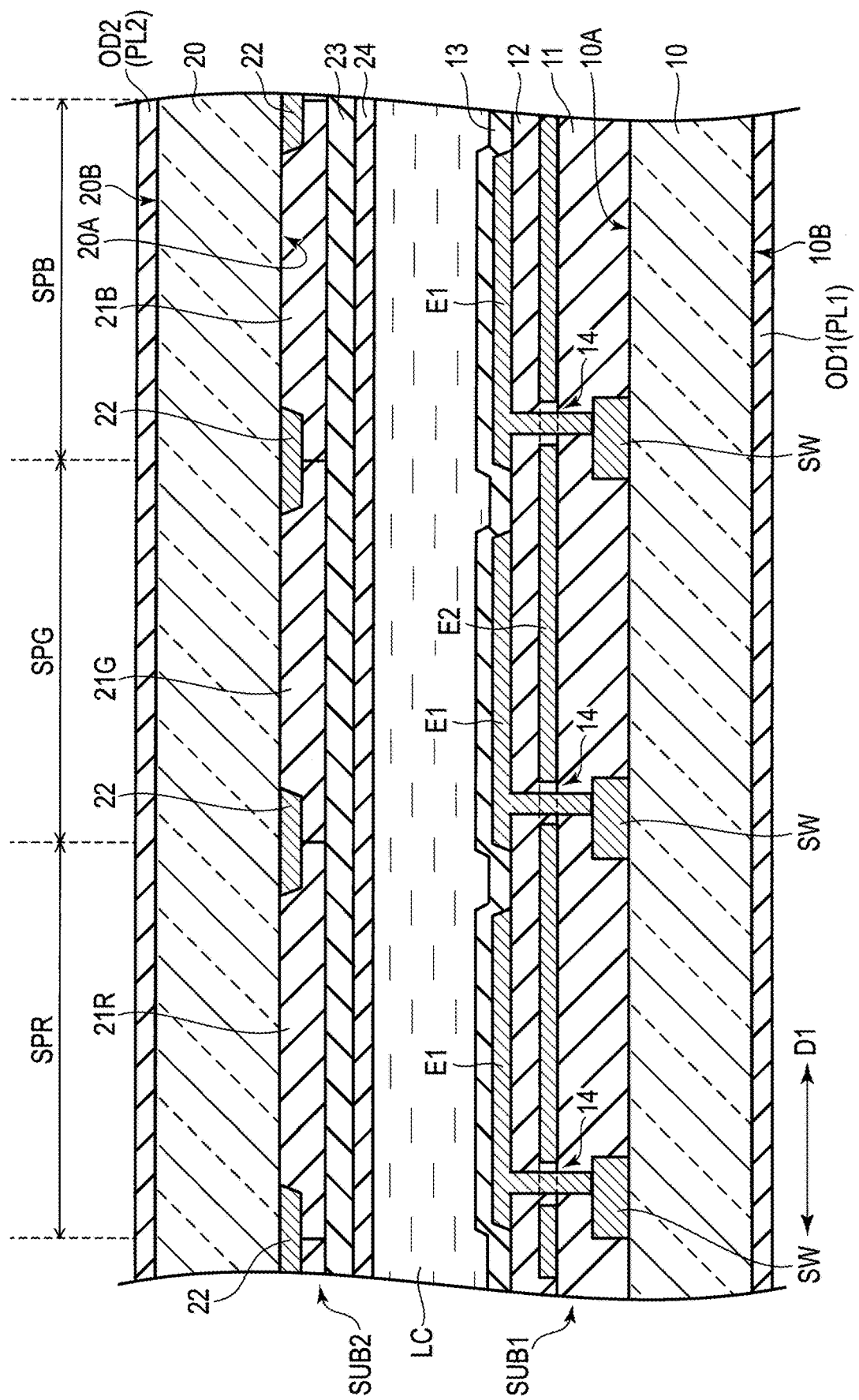
FIG. 3 is a cross-sectional view showing a part of a cross-section of the liquid crystal display device.

FIG. 3 shows a part of a cross-section of the liquid crystal display device 1. In FIG. 3, a cross-section of the sub-pixels SPR, SPG, and SPB included in one pixel PX, in the first direction D1, is illustrated.

The first substrate SUB1 includes a first insulating substrate 10 such as a glass substrate or a resin substrate having a light transmitting property. The first insulating substrate 10 has a first main surface 10A opposed to the second substrate SUB2 and a second main surface 10B on a side opposite to the first main surface 10A. Furthermore, the first substrate SUB1 includes the switching elements SW, the first electrodes E1, the second electrode E2, a first insulating layer 11, a second insulating layer 12, and a first alignment film 13.

The switching elements SW are disposed in the sub-pixels SPR, SPG, and SPB, respectively. The switching elements SW are provided on the first main surface 10A of the first insulating substrate 10 and covered with the first insulating layer 11.

In FIG. 3, illustration of the scanning signal lines G and the video signal lines S is omitted. Furthermore, the switching elements SW are simply illustrated in FIG. 3. In fact, the first insulating layer 11 includes a plurality of layers, and the switching elements SW include a semiconductor layers and various electrodes formed on the layers.

In the example of FIG. 3, the first electrode E1 is provided in each of the sub-pixels SPR, SPG, and SPB, and the second electrode E2 is provided to expand across the sub-pixels SPR, SPG, and SPB. The second electrode E2 is formed on the first insulating layer 11 (i.e., in the above-explained second layer). The second electrode E2 includes opening portions 14 located at positions opposed to the respective first electrodes E1. The second electrode E2 is covered with the second insulating layer 12.

The first electrode E1 is formed on the second insulating layer 12 (i.e., in the above-explained first layer) and is opposed to the second electrode E2. The first electrodes E1 are electrically connected to the switching elements SW of the sub-pixels SPR, SPG, and SPB through the opening portions 14, respectively. The first electrodes E1 and the second electrode E2 may be formed of a transparent conductive material such as indium tin oxide (ITO). The first alignment film 13 covers the first electrode E1 and is in contact with the liquid crystal layer LC. The first alignment film 13 is subjected to alignment treatment such as rubbing treatment or optical alignment treatment.

In contrast, the second substrate SUB2 includes a second insulating substrate 20 such as a glass substrate or a resin substrate having a light transmitting property. The second insulating substrate 20 has a first main surface 20A opposed to the first substrate SUB1 and a second main surface 20B on a side opposed to the first main surface 20A. Furthermore, the second substrate SUB2 includes color filters 21 (21R, 21G, and 21B), light-shielding layers (black matrixes) 22, an overcoat layer 23, and a second alignment film 24.

The light-shielding layers 22 are disposed on boundaries of the sub-pixels SPR, SPG, and SPB in planar view from a direction perpendicular to the first substrate SUB1 and the second substrate SUB2. In other words, the light-shielding layers 22 are disposed to overlap the scanning signal lines G and the video signal lines S and to partition the sub-pixel areas A. The overcoat layer 23 covers the color filters 21R, 21G, and 21B and planarizes surfaces of the color filters 21R, 21G, and 21B. The second alignment film 24 covers the overcoat layer 23 and in contact with the liquid crystal layer LC. The first alignment film 13 is subjected to alignment treatment such as rubbing treatment or optical alignment treatment, similarly to the first alignment film 13.

A first optical device OD1 including a first polarizer PL1 is disposed on the second main surface 10B of the first insulating substrate 10. In addition, a second optical element OD2 including a second polarizer PL2 is disposed on the second main surface 20B of the second insulating substrate 20. A first polarization axis (or a first absorption axis) of the first polarizer PL1 and a second polarization axis (or a second absorption axis) of the second polarizer PL2 have a crossed-Nicol relationship to be orthogonal to each other.

Figure 4:
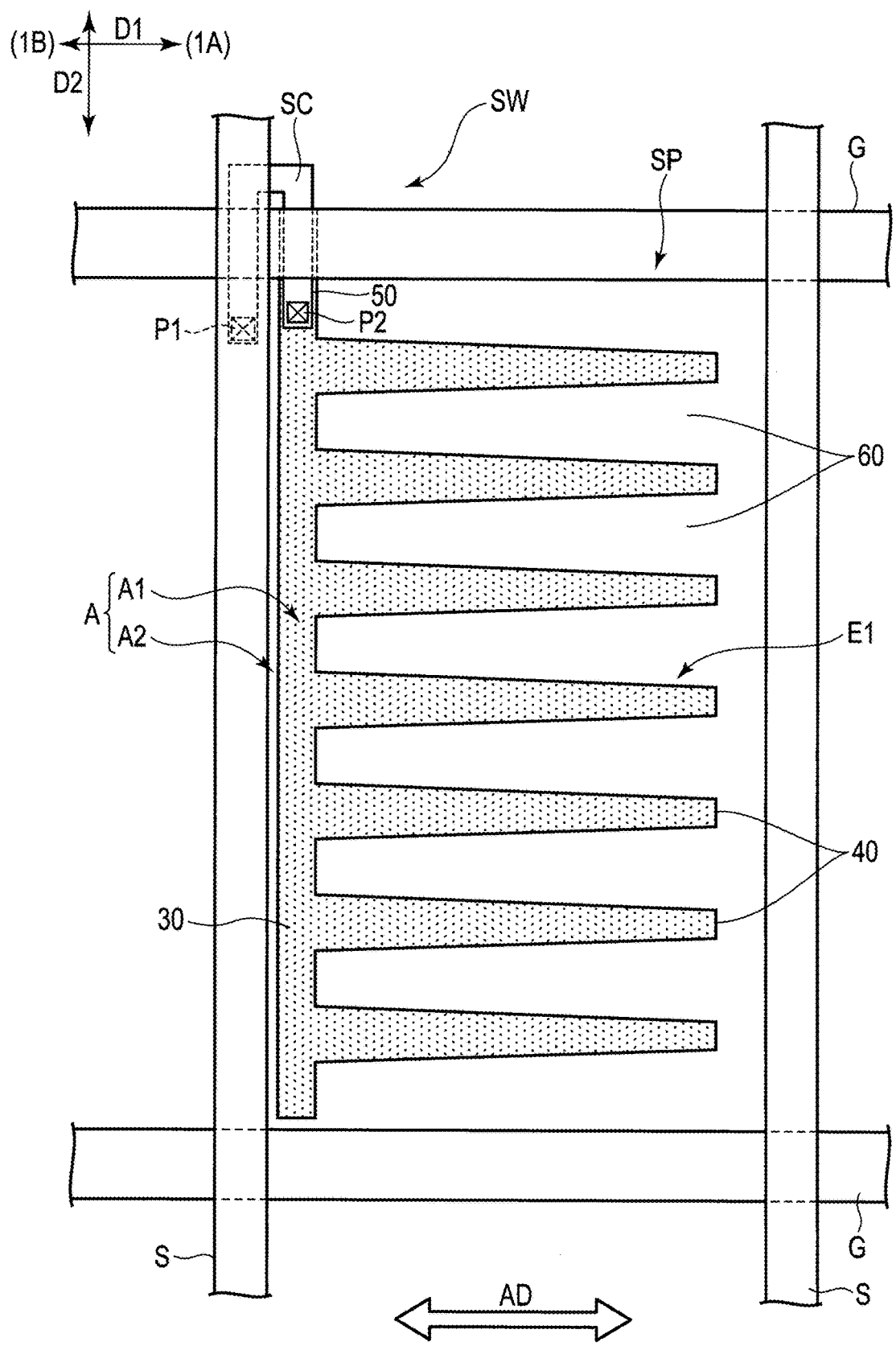
FIG. 4 is a schematic plan view showing sub-pixels in the liquid crystal display device.

FIG. 4 is a plan view schematically showing an example of the sub-pixel SP. In FIG. 4, one direction of the first direction D1 is defined as a first A direction and the other is defined as a first B direction. The sub-pixel area A is formed by two scanning signal lines G adjacent in the second direction D2 and two video signal lines S adjacent in the first direction D1. The light-shielding layers 22 are disposed to partition the sub-pixel areas A, at positions overlapping the scanning signal lines G and the video signal lines S, though not illustrated in FIG. 4.

The first sub-pixel area A includes a first area A1 and a second area A2. The first area A1 and the second area A2 are included in the above-explained first layer. In FIG. 4, the first area A1 is hatched by dots. The second area A2 is a shape formed by excluding the first area A1 from the sub-pixel area A. In the present embodiment, the first area A1 is an area where the first electrode E1 is formed (i.e., an area where the pixel electrode is disposed), and the second area A2 is an area where the first electrode E1 is not formed (i.e., an area where a pixel is not disposed).

The first area A1 includes an elongated axial area (connection area) 30 extending in the second direction D2, and branch areas 40 extending from the axial area 30. The branch areas 40 have, for example, a tapered shape narrowing toward a distal part. In FIG. 4, the branch areas 40 extend from the axial area 30 in the first A direction. In the sub-pixel area A, the axial area 30 is located at a position close to the video signal line S on the first B direction side. In addition, the branch areas 40 are located between two video signal lines (first and second video signal lines) S, and the distal parts of the branch areas 40 are located at positions close to the video signal lines S on the first A direction side. The second area A2 includes gap areas (first gap areas) 60 extending in the first A direction, between the adjacent branch areas 40.

The switching element SW includes a semiconductor layer SC. The semiconductor layer SC is connected to the video signal line S at a connection position P1 and connected to the first electrode E1 at a connection position P2. The switching element SW is therefore formed in a double-gate structure in which the semiconductor layer SC and the scanning signal line G overlap twice. In the example shown in FIG. 4, the connection position P2 is included in an end portion 50 of the axial area 30 extending in the second direction D2.

The first alignment film 13 and the second alignment film 24 shown in FIG. 3 are subjected to alignment treatment along the alignment treatment direction AD parallel to the first direction D1. Thus, the first alignment film 13 and the second alignment film 24 have a function of aligning the liquid crystal molecules in the initial alignment direction parallel to the alignment treatment direction AD. In other words, in the present embodiment, the direction of extension of the branch areas 40 matches the initial alignment direction of the liquid crystal molecules.

In this configuration, a high-speed response mode which is higher than a response speed of the general FFS mode can be implemented. The response speed is defined as, for example, a speed of transition of light transmittance of the liquid crystal layer LC at a certain level by applying a voltage between the first electrode E1 and the second electrode E2.

A principle of the operation of the high-speed response mode will be explained with reference to FIG. 5 to FIG. 7.

FIG. 5 shows a part of the second electrode E2 and liquid crystal molecules LM in their initial alignment state in the liquid crystal layer LC. The branch area 40 has a first side 41 and a second side 42 in a width direction (second direction D2). Furthermore, the branch area 40 has a top side 43 connecting the first side 41 and the second side 42 at a distal part. The first side 41 is inclined clockwise at an angle θ (for example, approximately 1.0 degree) that is an acute angle, in the alignment treatment direction AD, and the second side 42 is inclined counterclockwise at the angle θ in the alignment treatment direction AD. The first side 41 and the second side 42 may not be inclined in the alignment treatment direction AD.

The axial area 30 has a bottom side 31 between two adjacent branch areas 40. Furthermore, the axial area 30 has a side 32 on a side opposite to the bottom side 31. A slit SL (gap area) surrounded by a first side 41, a second side 42, and the bottom side 31 is formed between two adjacent branch areas 40. The slit SL is a part of the second area A2.

Corner portions C1 are formed by the bottom sides 31 and the first sides 41, corner portions C2 are formed by the first sides 41 and the top sides 43, corner portions C3 are formed by the bottom sides 31 and the second sides 42, and corner portions C4 are formed by the second sides 42 and the top sides 43.

In an off-state in which no voltage is applied between the first electrode E1 and the second electrode E2, liquid crystal molecules LM are subjected to the initial alignment such that their longitudinal axes conform to the alignment treatment direction AD as shown in FIG. 5.

If a fringe field is formed between two electrodes in the generally and widely employed FFS mode, all the liquid crystal molecules are rotated in the same direction. However, the rotation of the liquid crystal molecules in the high-speed response mode is different from the rotation of the liquid crystal molecules in the FFS mode.

FIG. 6 shows the aligned state of the liquid crystal molecules LM in an on-state in which a voltage is applied between the first electrode E1 and the second electrode E2. The liquid crystal molecules LM in the present embodiment have a positive dielectric anisotropy. In this case, if the voltage is applied between the first electrode E1 and the second electrode E2 in the off-state shown in FIG. 5, a force is produced to rotate the liquid crystal molecules LM in such a manner that their longitudinal axes become parallel to the direction of the electric field produced by the application of the voltage (or their longitudinal axes become orthogonal to the equipotential lines).

The liquid crystal molecules LM rotate in a first rotational direction R1 represented by an arrow of a solid line, at positions close to the corner portions C1 and C2. The liquid crystal molecules LM rotate in a second rotational direction R2 represented by an arrow of a dotted line, at positions close to the corner portions C3 and C4. The first rotational direction R1 is opposite to the second rotational direction R2. In the example shown in FIG. 6, the first rotational direction R1 is a counterclockwise direction and the second rotational direction R2 is a clockwise direction.

The corner portions C1 to C4 includes an alignment control function of controlling a rotational direction of the liquid crystal molecules LM at positions close to the first side 41 and the second side 42 (in other words, a function of stabilizing the alignment). That is, the liquid crystal molecules LM close to the first side 41 rotate in the first rotational direction R1 according to the rotation of the liquid crystal molecules LM at positions close to the corner portions C1 and C2. In addition, the liquid crystal molecules LM close to the second side 42 rotate in the second rotational direction R2 according to the rotation of the liquid crystal molecules LM at positions close to the corner portions C3 and C4. In contrast, the liquid crystal molecules LM rotating in the first rotational direction R1 and the liquid crystal molecules LM rotating in the second rotational direction R2 are be in competition with each other, at positions close to a center CR1 of the branch area 40 and a center CR2 of the slit SL in the second direction D2. For this reason, the liquid crystal molecules LM in these areas are maintained in their initial alignment state and rarely rotate.

Thus, rotational directions of the liquid crystal molecules LM are regular from the bottom side 31 to the top side 43 at positions close to the first side 41 and the second side 42, in the high-speed response mode. Thus, the response speed in the voltage application can be increased, irregularity of rotational directions of the liquid crystal molecules LM can be suppressed and alignment stability can be improved.

Figures 7, 8:
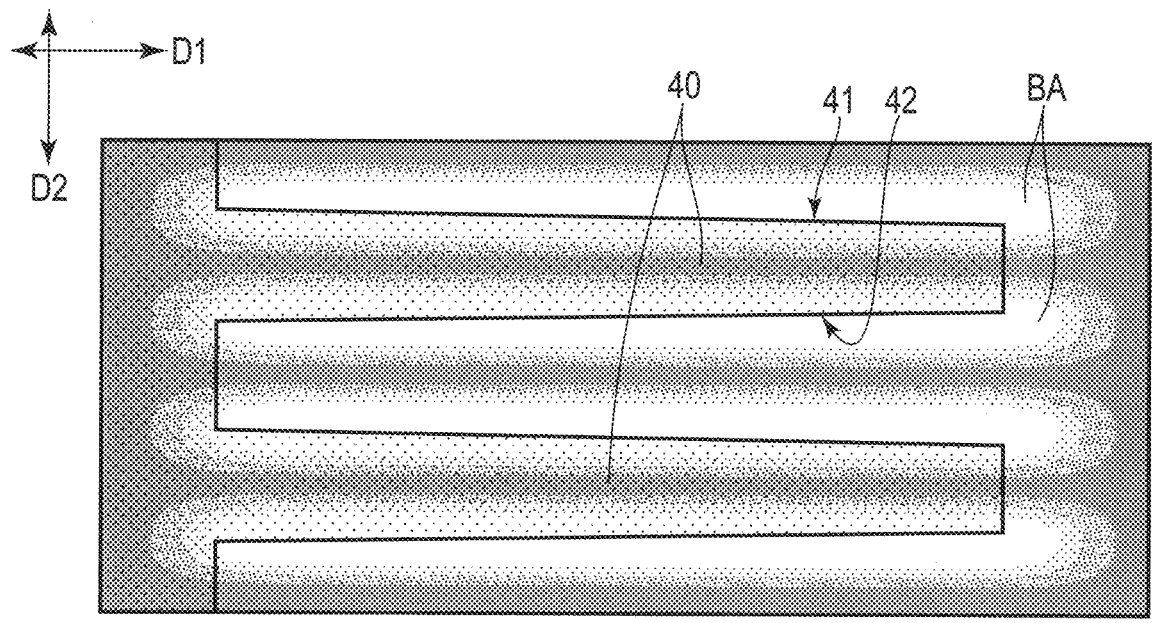
FIG. 7 is an illustration showing part of luminance distribution of light transmitted through a sub-pixel.
FIG. 8 is a table indicative of a response time corresponding to a slit pitch.

FIG. 7 shows part of the luminosity distribution of the light transmitted through the sub-pixel SP in the on-state. In FIG. 7, a whiter portion indicates higher luminance, and a blacker portion indicates lower luminance. High-luminance areas BA elongated in the second direction D2 appear at positions close to the first side 41 and the second side 42 where the liquid crystal molecules LM are rotated from their initial alignment state. In contrast, the luminance is low at positions close to the centers CR1 of the branch areas 40 and the centers CR2 of the slits SL since the liquid crystal molecules LM rarely rotate from their initial alignment state.

A feature that the first sides 41 and the second sides 42 are inclined with respect to the alignment treatment direction AD in the branch areas 40 shown in FIG. 5 to FIG. 7 contributes to the improvement of the alignment stability. That is, at positions close to the first sides 41 and the second sides 42, the rotational directions of the liquid crystal molecules LM in the voltage application can be set to be approximately constant since the direction of the electric field crosses the alignment treatment direction AD at any angle other than right angles. In particular, influence from the corner portions C1 to C4 becomes weak at middle portions of the branch areas 40 in the second direction D2. Therefore, this will be adverse to the alignment stability, but excellent alignment stability can be secured even at the middle portions by inclining the first sides 41 and the second sides 42 to the alignment treatment direction AD.

The principle of operations of the high-speed response mode has been explained, and the response speed can be further increased by, for example, narrowing the slit pitch in the liquid crystal display device of the high-speed response mode. The slit pitch can be defined as a distance between the centers CR1 of the adjacent branch areas 40.

More specifically, if the distance (alignment restriction distance) between the center CR1 of the branch area 40 and the center CR2 of the slit SL is made shorter by narrowing the slit pitch, the width of the high-luminance area BA becomes smaller and the speed of transition between the off-state and the on-state becomes higher. According to this, a higher speed response can be implemented.

FIG. 8 shows a response time corresponding to the slit pitch. The response time is assumed to include a rise time tr and a fall time tf. The rise time tr indicates a time to transition from the off-state to the on-state. In contrast, the fall time tf indicates a time to transition from the on-state to the off-state.

In FIG. 8, the rise time tr is 6.50 ms and the fall time tf is 3.75 ms when the slit pitch is 7 µm. In contrast, the rise time tr is 4.95 ms and the fall time tf is 3.00 ms when the slit pitch is 6 µm. According to this, the response time (rise time tr and fall time tf) becomes shorter by narrowing the slit pitch from 7 µm to 6 µm.

In addition, as shown in FIG. 8, the response time can be made further shorter by further narrowing the slit pitch to 5 µm or 4 µm.

However, the transmittance is often lowered if the configuration of narrowing the slit pitch for the high-speed response is adopted as explained above. More specifically, the transmittance is lowered, if the above-explained interval between the center CR1 of the branch area 40 and the center CR2 of the slit SL becomes shorter and the (quantity of) area of low luminance is entirely increased, by not varying the area of the sub-pixel area A shown in FIG. 4, but adopting the configuration of narrowing the slit pitch.

Figure 9:
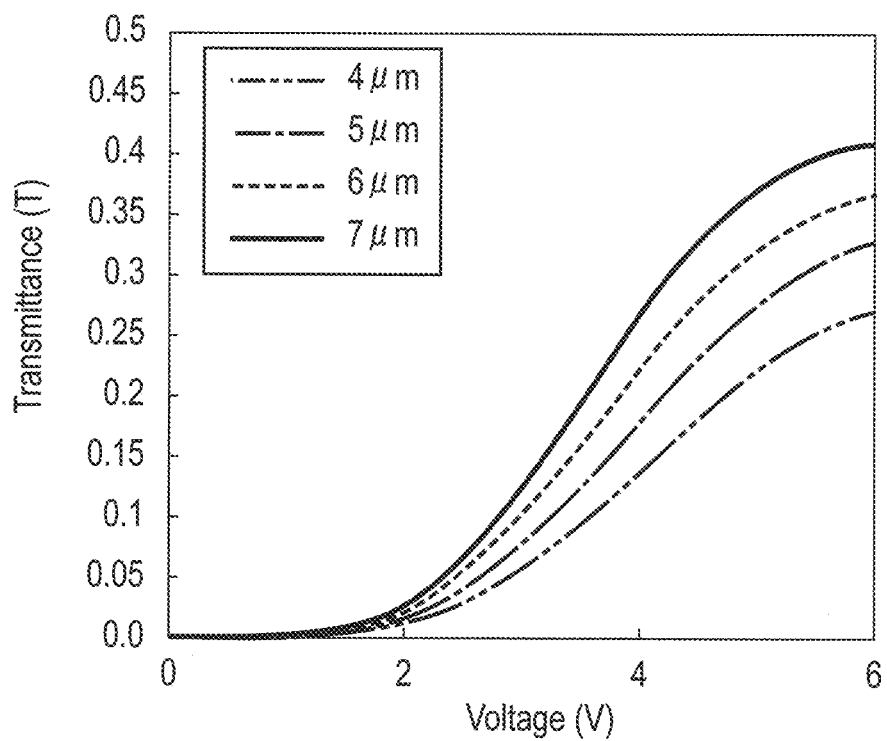
FIG. 9 is a graph showing a relationship between transmittance and voltage in each slit pitch.

FIG. 9 shows a relationship between the transmittance and the voltage in each slit pitch of 4 µm to 7 µm. The voltage shown in FIG. 9 indicates a voltage (value) applied to the first electrode E1 (pixel electrode) in accordance with the video signal.

It is assumed that, for example, the voltage of 0V to 6V is applied to each of the first electrodes E1 configured to have the slit pitch of 4 µm to 7 µm. In this case, for example, when the transmittance in a case where the slit pitch is 6 µm is compared with the transmittance in a case where the slit pitch is 7 µm, the transmittance in a case where the slit pitch is 6 µm is lower than the transmittance in a case where the slit pitch is 7 µm even if any voltage of 0V to 6V is applied as shown in FIG. 9.

Similarly, the transmittance in a case where the slit pitch is 5 µm is lower than the transmittance in a case where the slit pitch is 6 µm. In addition, the transmittance in a case where the slit pitch is 4 µm is lower than the transmittance in a case where the slit pitch is 5 µm.

Therefore, the transmittance is lowered if the configuration of narrowing the slit pitch to implement the high-speed response is adopted.

Incidentally, if the voltage (value) applied to the first electrode E1 is made higher than a predetermined value, an alignment failure occurs, and the liquid crystal molecules LM respond at a low speed (i.e., the low-speed response area appears) at positions close to the distal parts of the branch areas 40 and positions close to the proximal parts of the branch areas 40 (connection portions between the axial area 30 and the branch areas 40). The low-speed response area is an area where the response speed of the liquid crystal is lower than that in the high-luminance area BA (high-speed response area) between the branch areas 40. The area where the rotational directions of the liquid crystal molecules are different is not adjacent to this area. For this reason, the liquid crystal molecules of this area have the same response speed as the speed in the conventional FFS mode.

Figure 10:
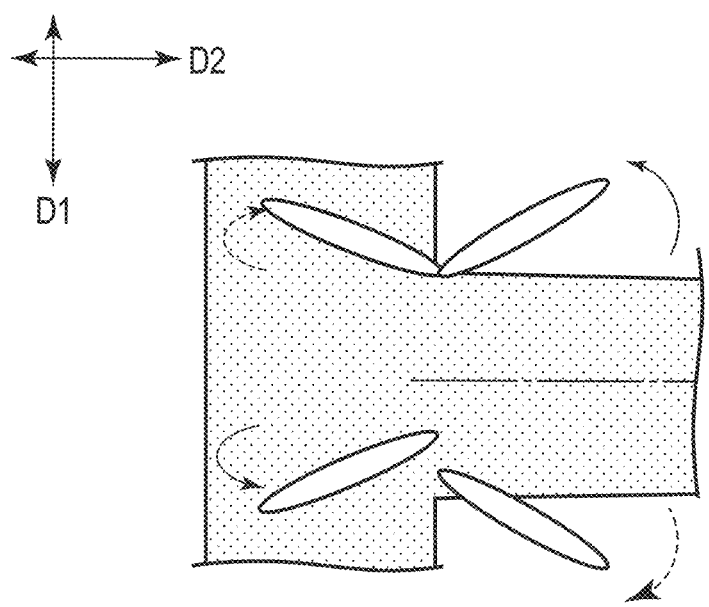
FIG. 10 is an illustration showing an alignment state of liquid crystal molecules LM at a position close to a proximal part of a branch area when applying a high voltage to a first electrode.

FIG. 10 is an illustration showing an alignment state of the liquid crystal molecules LM at a position close to the proximal part of the branch area 40 when applying a high voltage to the first electrode E1. In the present embodiment, the high voltage indicates a voltage which is high enough to cause the above-explained low-speed response area to appear. In contrast, the low voltage indicates a voltage which is low enough to suppress appearance of the above-explained low-speed response area.

If the high voltage is applied to the first electrode E1, the liquid crystal molecules LM at positions overlapping the axial area 30 where the initial alignment state is maintained (i.e., the liquid crystal molecules rarely rotate) in the application of the low voltage are to rotate in the direction opposite to the rotation of the liquid crystal molecules LM at positions close to the first side 41 and the second side 42, as shown in FIG. 10. In this case, a rotational force is generated at the liquid crystal molecules LM where the initial alignment state is maintained, and the liquid crystal molecules LM rotate together with, for example, the liquid crystal molecules LM at positions close to the first side 41 and the second side 42. Thus, the above-explained low-speed response area appears since the area occupied by the liquid crystal molecules in the same rotation direction becomes wide and the alignment restriction distance around the liquid crystal molecules becomes long. The liquid crystal molecules LM at a position close to the proximal part of the branch area 40 have been explained with reference to FIG. 10, but the low-speed response area appears similarly at the position close to the distal part of the branch area 40.

Figure 11:
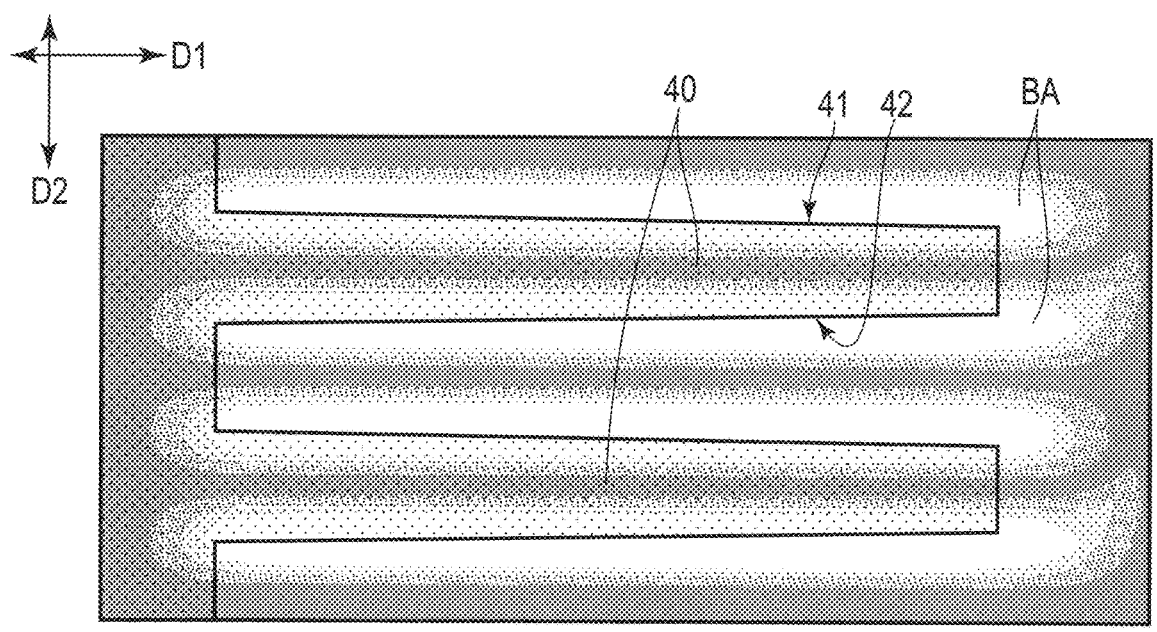
FIG. 11 is an illustration showing a position of the luminance distribution when a low-speed response area appears at a distal part of the branch area.
Figure 12:
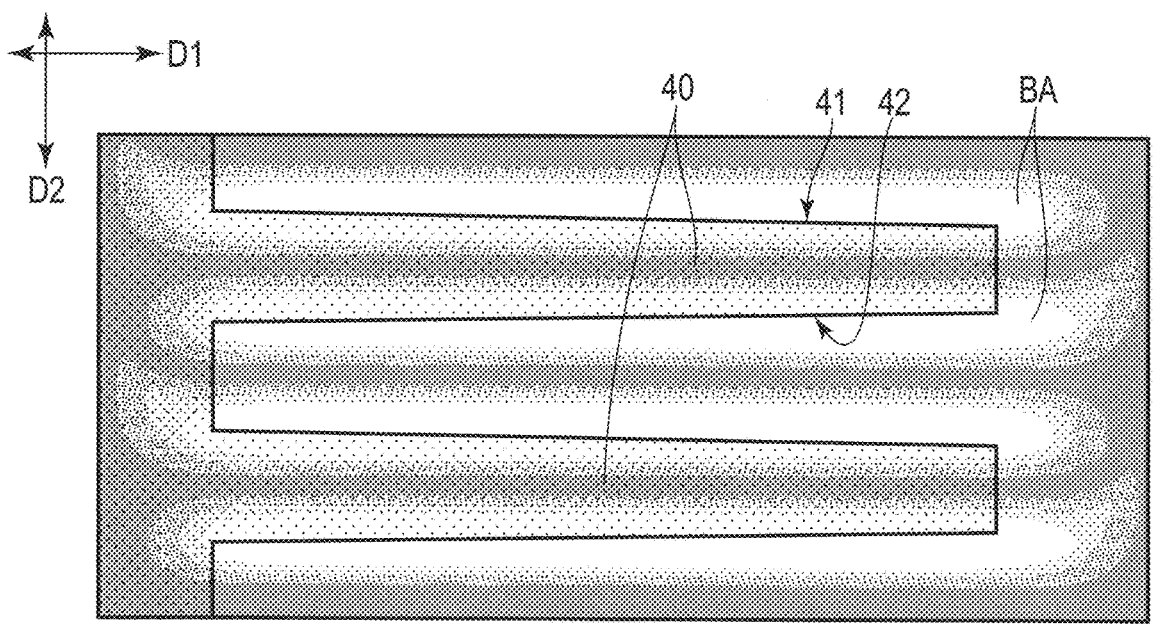
FIG. 12 is an illustration showing a position of the luminance distribution when a low-speed response area appears at a proximal part of the branch area.

The voltage at which the low-speed response area appears at a position close to the distal part of the branch area 40 is often lower than the voltage at which the low-speed response area appears at a position close to the proximal part of the branch area 40. According to this, if the voltage applied to the first electrode E1 is made higher, the low-speed response areas first appear at the distal parts of the branch areas 40 and the luminance distribution is varied (i.e., the areas where the luminance is high are increased) as shown in FIG. 11. Next, if the voltage applied to the first electrode E1 is made further higher, the low-speed response areas also appear at the proximal parts of the branch areas 40 and the luminance distribution is further varied (i.e., the areas where the luminance is high are further increased) as shown in FIG. 12.

In general, the low-speed response areas are hidden by the above-explained light-shielding layers 22 and the like to implement the high-speed response. If the low-speed response area is used, however, the area where the luminance is high (bright area) can be expanded. For this reason, use of the low-speed response area contributes to the rise of the transmittance.

Figure 13:
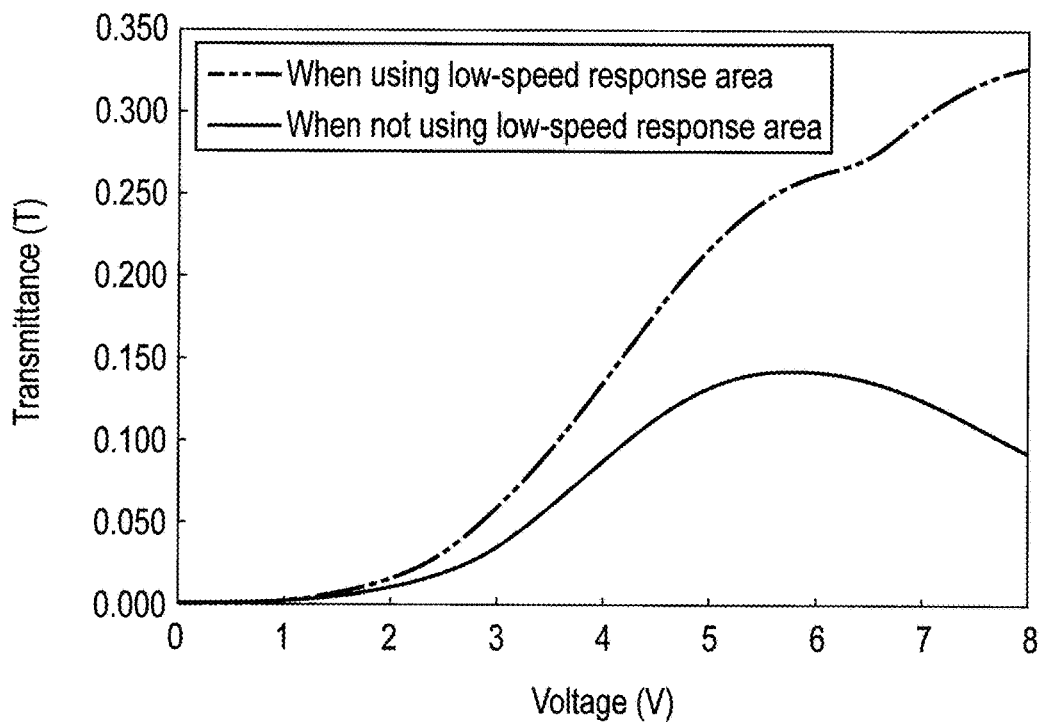
FIG. 13 is a graph for comparison between the transmittance in a case of not using a low-speed response area and the transmittance in a case of using a low-speed response area.

FIG. 13 shows an example of comparison between the transmittance in a case where the low-speed response area is not used (i.e., the low-speed response area is hidden) and the transmittance in a case where the low-speed response area is used (i.e., the low-speed response area is not hidden) when the slit pitch is the same.

If the low-speed response area is not used, the high-speed response can be implemented irrespective of the voltage value applied to the first electrode E1, but the transmittance becomes lower as shown in FIG. 13. In contrast, if the low-speed response area is used, the response speed is lower as compared with a case where the low-speed response area is not used, but a high transmittance can be obtained.

In other words, if the low-speed response area is used, the transmittance can be improved even in a case of adopting the configuration of narrowing the slit pitch to implement the high-speed response as explained above.

Thus, the liquid crystal display device 1 according to the present embodiment has a function (hereinafter called a mode switching function) of switching a mode (hereinafter called a first mode) of putting importance on the transmittance and a mode (hereinafter called a second mode) of putting importance on the response speed, in accordance with the circumstances.

Summary of the first mode and the second mode in the present embodiment will be explained with reference to FIG. 14.

In the present embodiment, the liquid crystal display device 1 drives in the first mode when putting importance on the transmittance. As shown in FIG. 14, in the first mode, a high voltage can be applied to the first electrode E1 to use not only the high-speed response area, but also the low-speed response area as the luminance areas.

In contrast, the liquid crystal display device 1 drives in the second mode when putting importance on the response speed. As shown in FIG. 14, in the second mode, a high voltage is not applied to the first electrode E1 since the high-speed response area alone is used.

Figure 14:
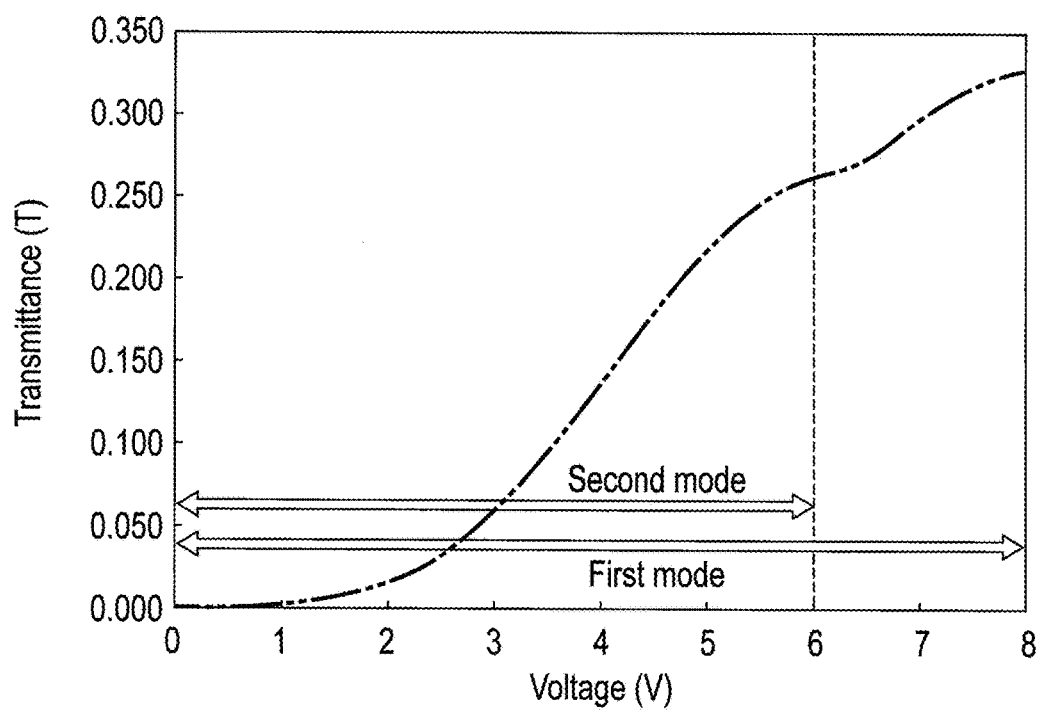
FIG. 14 is a graph for explanation of summary of a first mode and a second mode.

In FIG. 14, a range of the voltage (value) applied to the first electrode E1 in the first mode is, for example, a range from 0V to 8V. In other words, in the liquid crystal display device 1, the image can be displayed by applying the voltage corresponding to the video signal to the first electrode E1 but, in the first mode, the voltage corresponding to the video signal in the range from 0V to 8V is applied to the first electrode E1. According to this, when the liquid crystal display device 1 drives in the first mode, the low-speed response area appears and the transmittance can be improved remarkably if, for example, the voltage of 6V or more is applied as the voltage corresponding to the video signal.

In contrast, a range of the voltage (value) applied to the first electrode E1 in the second mode is, for example, a range from 0V to 6V. In other words, in the second mode, the voltage corresponding to the video signal in the range from 0V to 6V is applied to the first electrode E1.

Thus, the liquid crystal display device 1 according to the present embodiment is configured such that a maximum value of the voltage (first voltage) applied to the first electrode E1 (pixel electrode) in the first mode becomes higher than a maximum value of the voltage applied to the first electrode E1 in the second mode.

The range (maximum value) of the voltage applied to the first electrode E1 in the second mode is set at a value which does not cause the low-speed response area to appear and enables the high-speed response to be implemented when, for example, the voltage value of this range is applied to the first electrode E1.

In contrast, when the range of the voltage in which the low-speed response area occurs is narrow (i.e., the maximum value of the range of the voltage is low), the effect of increase of the transmittance is low even if the voltage is applied to the first electrode E1 in accordance with the video signal. For this reason, (the maximum value of) the range of the voltage applied to the first electrode E1 in the first mode is set at a value which is high enough to sufficiently increase the transmittance. More specifically, the maximum value of the voltage applied to the first electrode E1 in the first mode is assumed to be, for example, higher than the maximum value of the voltage applied to the first electrode E1 in the second mode by 1V or more.

Since the maximum application voltage in the first mode is different from that in the second mode, the gradation data may be changed in the first mode and the second mode. For example, when 256 gradation is set at 8V in the first mode, 256 gradation may be set at 6V in the second mode.

To use the above-explained low-speed response area, the light-shielding layer 22 need to be disposed so as not to hide the low-speed response area in planar view from the direction perpendicular to the surfaces of the first substrate SUB1 and the second substrate SUB2.

Figure 15:
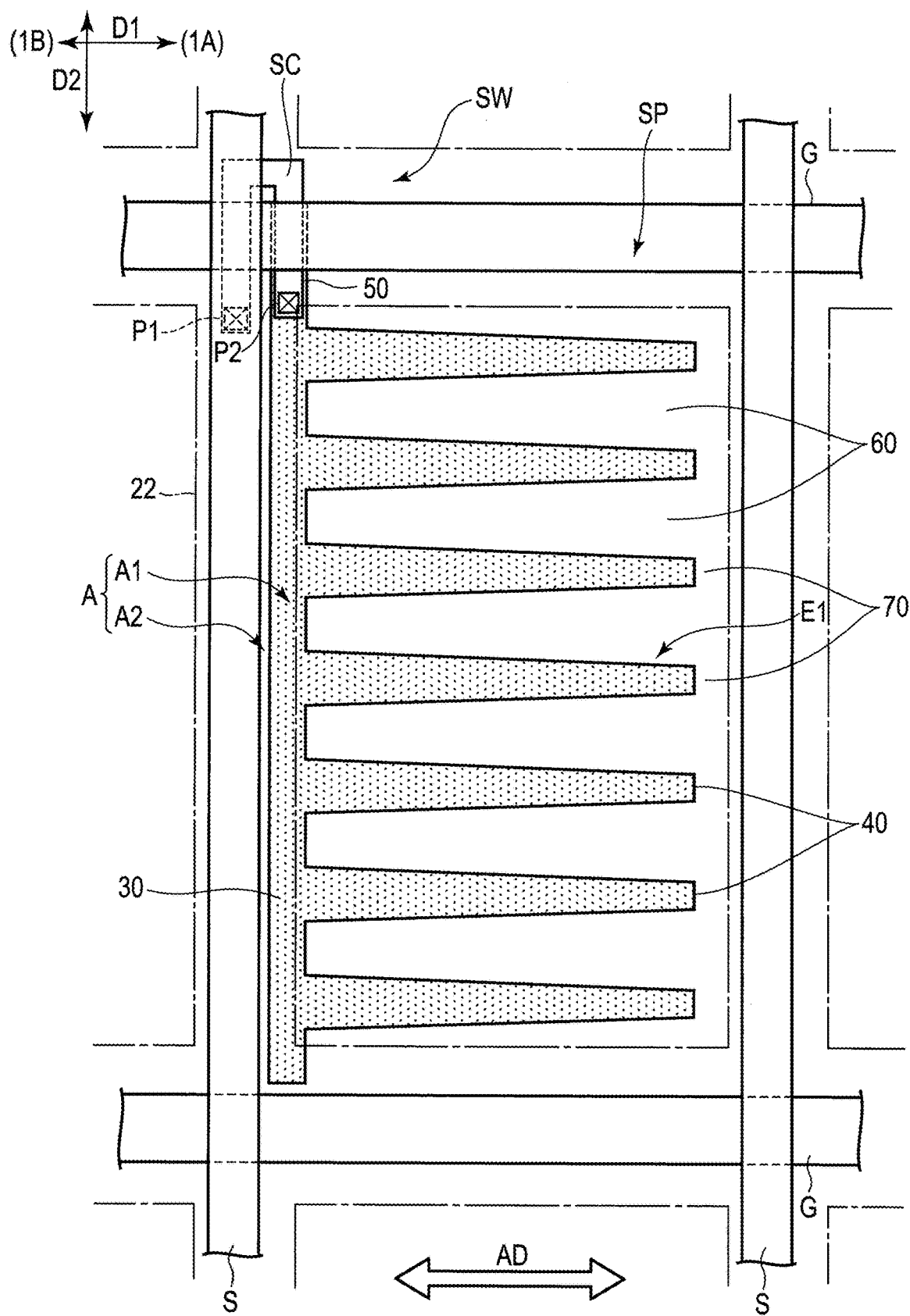
FIG. 15 is a plan view showing an example of arrangement of a light-shielding layer in the liquid crystal display device.

An example of arrangement of the light-shielding layer 22 in the liquid crystal display device 1 according to the present embodiment will be hereinafter explained with reference to FIG. 15. In FIG. 15, an edge portion of the light-shielding layer 22 in a schematic plan view of the sub-pixel SP is represented by a one-dot-chained line.

In the present embodiment, the low-speed response area occurring when a high voltage is applied to the first electrode E1 includes the surrounding of the distal parts of the branch areas 40. For this reason, as shown in FIG. 15, the light-shielding layer 22 is disposed at a position where the light-shielding layer 22 does not hide the surrounding of the distal parts of the branch areas 40 in planar view.

More specifically, the distal parts of the branch areas 40 do not overlap the light-shielding layer 22, and gap areas (second gap areas) 70 extending in the second direction D2 exist between the distal parts of the branch areas 40 and the light-shielding layers 22.

Figure 16:
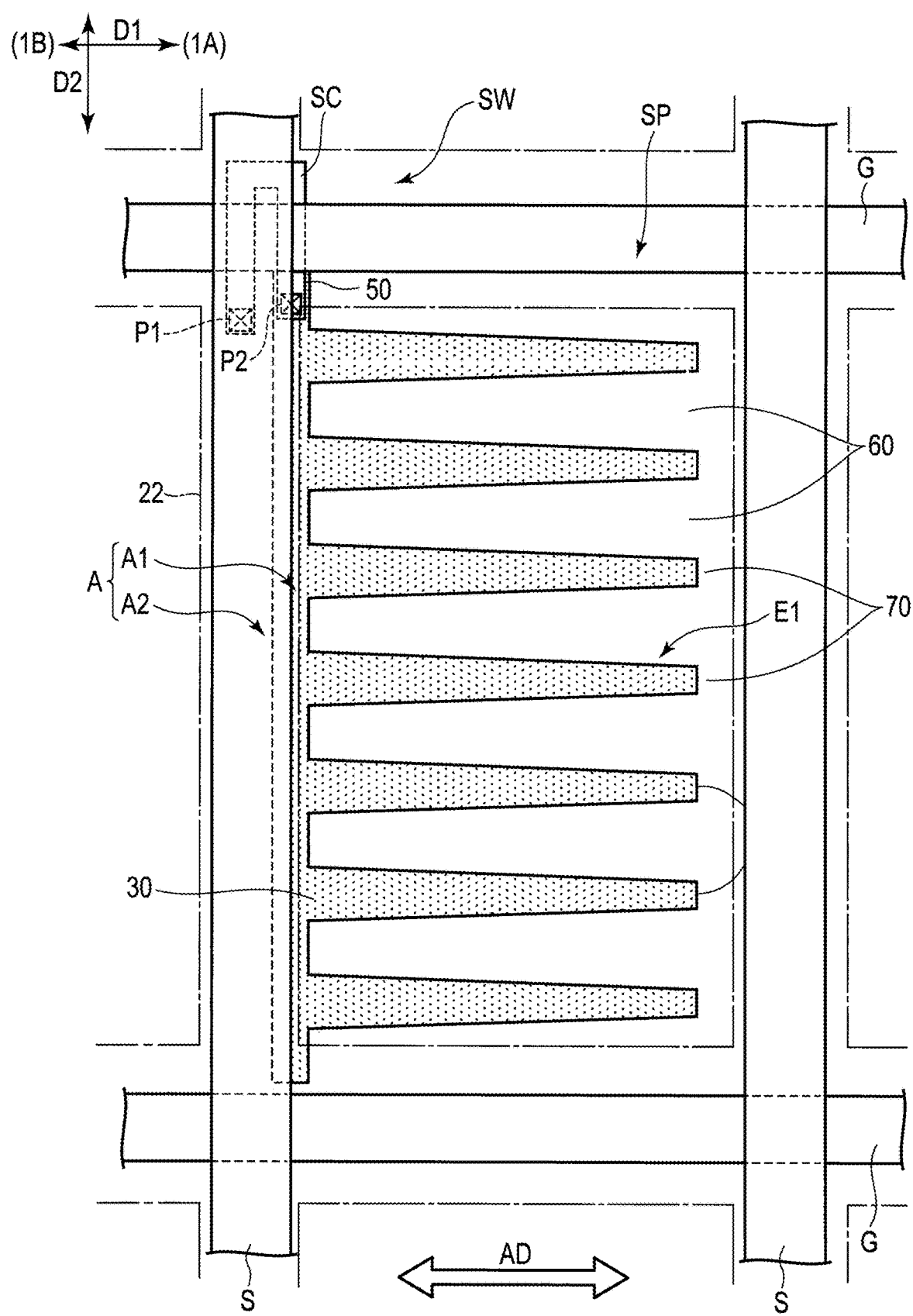
FIG. 16 is a plan view showing an example of arrangement of a light-shielding layer in the liquid crystal display device.

In addition, at least a part of the axial area 30 is disposed to overlap the light-shielding layer 22. According to this, for example, even if the signal lines (for example, the video signal lines S and the like) extending in the second direction D2 are wide, the light-shielding layer 22 can be designed to be wide enough to overlap the signal lines. As shown in FIG. 16, for example, the axial area 30 may overlap the video signal lines S and the light-shielding layer 22.

According to this configuration, the transmittance can be improved since the low-speed response area around the distal parts of the branch areas 40 can be used.

The axial area 30 overlapping the light-shielding layers 22 has been explained with reference to FIG. 15 and FIG. 16, but the light-shielding layer 22 may be disposed so as not to hide the axial area 30 (i.e., not to overlap the axial area 30).

In addition, the liquid crystal display device 1 according to the present embodiment is desirably designed such that the slit pitch, the cell gap, the distance between the first electrodes E1 (ITO electrodes) and the like are appropriate values, from the viewpoint of implementation of the high-speed response and the increase in the transmittance. The slit pitch is the distance between the centers CR1 of the adjacent branch areas 40 in the first electrode E1 explained with reference to FIG. 4. In addition, the cell gap is a thickness of the liquid crystal LC disposed between the alignment films 13 and 24 shown in FIG. 3. The distance between the first electrodes E1 (hereinafter called an interelectrode distance) is defined as a distance between the first electrodes E1 in the first direction D1 in a case where the sub-pixel areas A are arranged, for example, a distance from the distal parts of the branch areas 40 of the first electrode E1 on the first B direction side to the axial area 30 of the first electrode E1 on the first A direction side.

Figures 17, 18, 19:
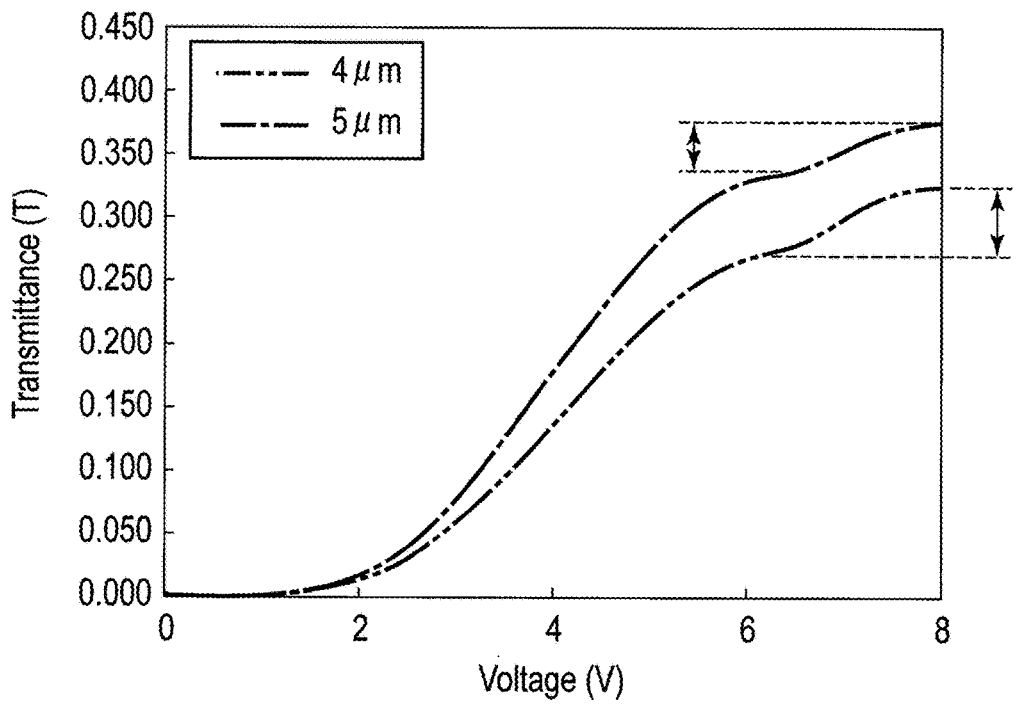
FIG. 17 is a graph showing a relationship between transmittance and voltage in each slit pitch in a case of applying a high voltage to a first electrode.
FIG. 18 is a table showing a voltage at which the low-speed response area appears at a distal part of the branch area of the first electrode.
FIG. 19 is a table showing a voltage at which the low-speed response area appears at a proximal part of the branch area of the first electrode.

First, FIG. 17 shows a relationship between the transmittance and the voltage in each of the slit pitches of 4 μm and 5 μm in a case where a high voltage is applied to the first electrode E1. The transmittance is lowered if the configuration in which the width of the slit pitch is narrowed is adopted as explained with reference to FIG. 9 but, as shown in FIG. 17, the degree of increase in the transmittance in a case where a high voltage (for example, 8V) is applied to the first electrode E1 having the slit pitch of 4 μm is larger than the degree of increase in the transmittance in a case where a high voltage is applied to the first electrode E1 having the slit pitch of 5 μm. For this reason, the effect of increase in the transmittance in a case where a high voltage is applied to the first electrode E1 having a narrower slit pitch is considered higher.

In addition, the cell gap d affects the voltage at which the alignment failure (low-speed response area) occurs. FIG. 18 shows voltages at which the low-speed response area occurs at the distal parts of the branch areas 40 of the first electrode E1 when the cell gap d is 2.7 μm and 1.9 μm.

In FIG. 18, when the cell gap d is 2.7 μm, the voltage at which the low-speed response area occurs at the distal parts of the branch areas 40 of the first electrode E1 configured to have the slit pitch of 4 μm is 7.6V. When the cell gap d is 2.7 μm, the voltage at which the low-speed response area occurs at the distal parts of the branch areas 40 of the first electrode E1 configured to have the slit pitch of 5 μm is 7.7V.

Similarly, when the cell gap d is 1.9 μm, the voltage at which the low-speed response area occurs at the distal parts of the branch areas 40 of the first electrode E1 configured to have the slit pitch of 4 μm is 7.9V. In addition, when the cell gap d is 1.9 μm, the voltage at which the low-speed response area occurs at the distal parts of the branch areas 40 of the first electrode E1 configured to have the slit pitch of 5 μm is 8.5V.

FIG. 19 shows voltages at which the low-speed response area occurs at the proximal parts of the branch areas 40 of the first electrode E1 when the cell gap d is 2.7 μm and 1.9 μm.

In FIG. 19, when the cell gap d is 2.7 μm, the voltage at which the low-speed response area occurs at the proximal parts of the branch areas 40 of the first electrode E1 configured to have the slit pitch of 4 μm is 9.2V. In addition, when the cell gap d is 2.7 μm, the voltage at which the low-speed response area occurs at the proximal parts of the branch areas 40 of the first electrode E1 configured to have the slit pitch of 5 μm is 8.5V.

Similarly, when the cell gap d is 1.9 μm, the voltage at which the low-speed response area occurs at the proximal parts of the branch areas 40 of the first electrode E1 configured to have the slit pitch of 4 μm is 9.9V. In addition, when the cell gap d is 1.9 μm, the voltage at which the low-speed response area occurs at the proximal parts of the branch areas 40 of the first electrode E1 configured to have the slit pitch of 5 μm is 10.0V.

In other words, in FIG. 18 and FIG. 19, the voltage at which the low-speed response area occurs in a case where the cell gap d is 2.7 μm is lower than that in a case where the cell gap d is 1.9 μm. Thus, the transmittance can be raised at a lower voltage, since the voltage at which the low-speed response area occurs is lowered when the cell gap d is increased.

In the present embodiment, the cell gap d is assumed to be, for example, 2.5 μm to 3.5 μm, based on the relationship between the cell gap d and the voltage at which the low-speed response area occurs.

Figure 20:
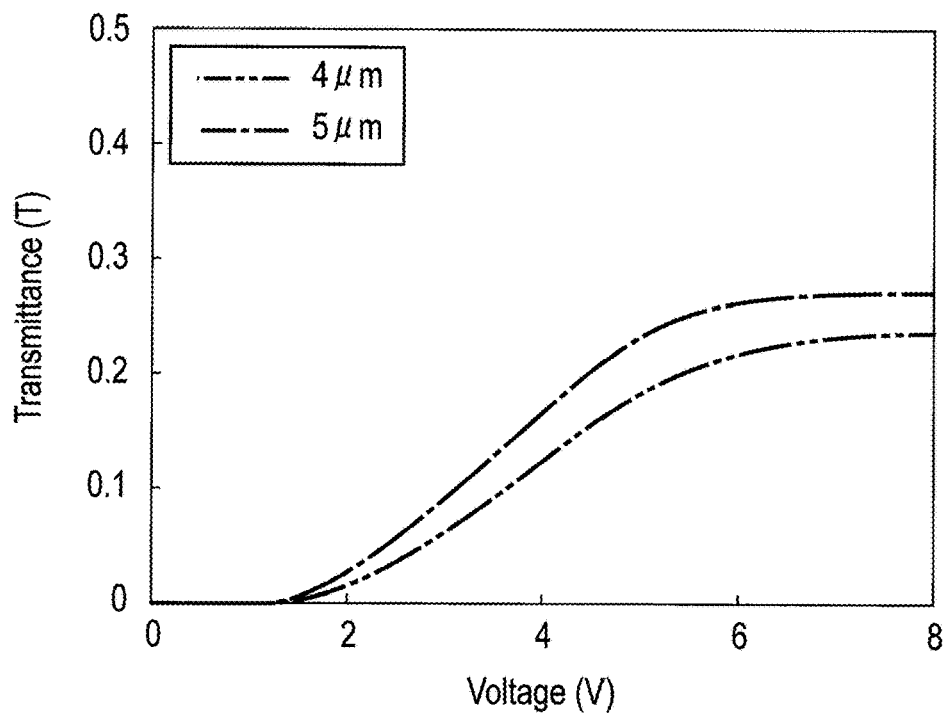
FIG. 20 is a graph showing a transmittance in a case where a cell gap is 2.75 μm.
Figure 21:
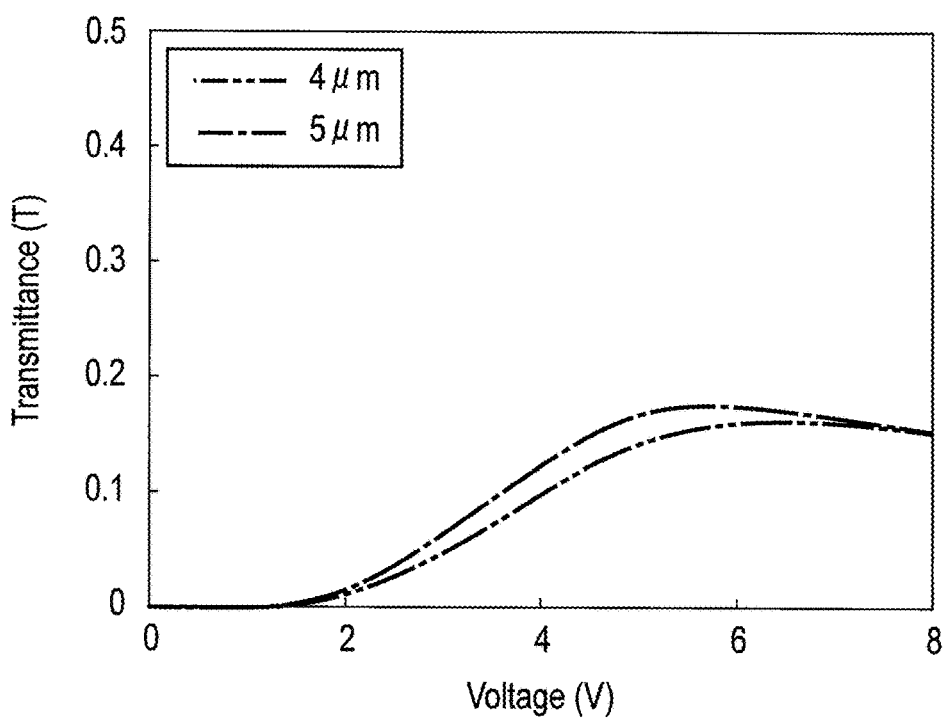
FIG. 21 is a graph showing a transmittance in a case where a cell gap is 1.9 μm.

The slit pitches are 4 μm and 5 μm for convenience, but FIG. 20 shows the transmittance in a case where the cell gap d is 2.75 μm and FIG. 21 shows the transmittance in a case where the cell gap d is 1.9 μm. According to this, a high transmittance can be implemented by setting the cell gap d at, for example, 2.75 μm.

Figures 22, 23, 24:
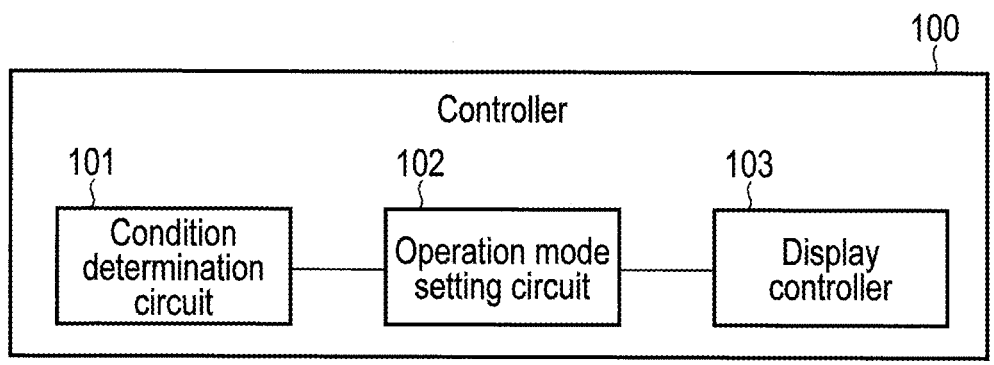
FIG. 22 is a table showing a voltage at which the low-speed response area appears at a distal part of the branch area of the first electrode in a case where an inter-electrode distance is 2 μm and 3 μm.
FIG. 23 is a table showing a voltage at which the low-speed response area appears at a proximal part of the branch area of the first electrode in a case where an inter-electrode distance is 2 μm and 3 μm.
FIG. 24 is a block diagram showing an example of a functional configuration of a controller.

In addition, the interelectrode distance affects the voltage at which the low-speed response area occurs, similarly to the cell gap d. FIG. 22 shows a voltage at which the low-speed response area occurs at the distal parts of the branch areas 40 of the first electrode E1 in a case where the interelectrode distance is 2 μm and 3 μm. FIG. 23 shows a voltage at which the low-speed response area occurs at the proximal parts of the branch areas 40 of the first electrode E1 in a case where the interelectrode distance is 2 μm and 3 μm. In FIG. 22 and FIG. 23, the slit pitch is 4 μm and the cell gap d is 2.7 μm.

As shown in FIG. 22, the voltage at which the low-speed response area occurs at the distal parts of the branch areas 40 of the first electrode E1 is 7.7V when the interelectrode distance is 2 μm and 8.0V when the interelectrode distance is 5pm. In other words, when the interelectrode distance becomes longer, the voltage at which the low-speed response area occurs at the distal parts of the branch areas 40 of the first electrode E1 becomes higher.

In contrast, as shown in FIG. 23, the voltage at which the low-speed response area occurs at the proximal parts of the branch areas 40 of the first electrode E1 is 8.5V when the interelectrode distance is 2 μm and 7.5V when the interelectrode distance is 3 μm. In other words, when the interelectrode distance becomes longer, the voltage at which the low-speed response area occurs at the proximal parts of the branch areas 40 of the first electrode E1 becomes lower.

The present embodiment can be configured such that the interelectrode distance is, for example, 2 μm to 3 μm but, preferably, the interelectrode distance should be 3 μm and the difference between the voltages at which the low-speed response area occurs at the distal parts and proximal parts of the branch areas 40 should be small to efficiently use both of the low-speed response area which occurs at the distal parts of the branch areas 40 of the first electrode E1 and the low-speed response area which occurs at the proximal parts of the branch areas 40 of the first electrode E1.

In the present embodiment, the liquid crystal display device 1 is configured by selecting (designing) the arbitrarily optimum slit pitch, cell gap, and interelectrode distance, from the viewpoint of implementation of the high-speed response and the increase in the transmittance.

Switching of the first mode and the second mode (i.e., the mode switching function) in the liquid crystal display device 1 configured as explained above is implemented by a controller (control circuit) included in the driver IC 4. That is, in the present embodiment, the controller has the first mode and the second mode as the operation modes of the liquid crystal display device 1.

FIG. 24 shows an example of a functional configuration of the controller for implementing the mode switching function. As shown in FIG. 24, the controller 100 includes a condition determination circuit 101, an operation mode setting circuit 102, and a display controller 103.

The condition determination circuit 101 determines whether to drive the liquid crystal display device 1 in the first mode or not, based on a condition (hereinafter called a first mode drive condition) for driving the liquid crystal display device 1 in the first mode. The first mode drive condition is set to be preliminarily held in, for example, the driver IC 4 (controller 100).

The operation mode setting circuit 102 sets (changes) the operation mode of the liquid crystal display device 1. The operation modes of the liquid crystal display device 1 includes the first mode and the second mode.

The display controller 103 drives the liquid crystal display device 1 in accordance with the operation mode set by the operation mode setting circuit 102. In this mode, the display controller 103 displays the video by, for example, applying to the first electrode E1 the voltage corresponding to the video signal output from the control module 5.

Figure 25:
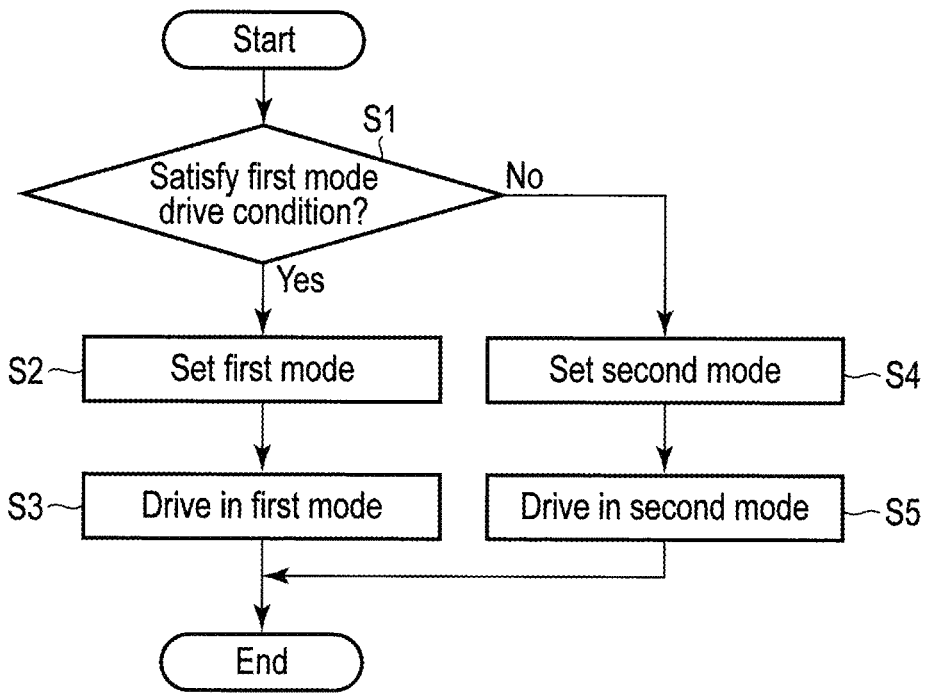
FIG. 25 is a flow chart showing an example of a procedure of the liquid crystal display device in a case of switching the first mode and the second mode.

Next, an example of a procedure of the liquid crystal display device 1 in a case of switching the first mode and the second mode will be explained with reference to a flow chart of FIG. 25. The procedure shown in FIG. 25 is executed by the above-explained controller 100 but may be executed by, for example, exclusive IC, CPU, and the like provided outside the driver IC 4.

The liquid crystal display device 1 is assumed to drive in one of the first mode and the second mode.

In this case, the condition determination circuit 101 determines whether the operation or state of the liquid crystal display device 1 satisfies the first mode drive condition or not (i.e., whether to drive the liquid crystal display device 1 in the first mode or not) (step S1).

If it is determined that the operation or state of the liquid crystal display device 1 satisfies the first mode drive condition (YES in step S1), the operation mode setting circuit 102 sets the first mode as the operation mode of the liquid crystal display device 1 (step S2). In this case, for example, a range from 0V to 8V is set as the range of the voltage applied to the first electrode E1.

If the first mode is set as the operation mode of the liquid crystal display device 1, the display controller 103 drives the liquid crystal display device 1 in the first mode (step S3). In this mode, the display controller 103 displays the video (image) by, for example, applying to the first electrode E1 the voltage corresponding to the video signal output from the control module 5, within the range of the voltage set by the operation mode setting circuit 102 (i.e., the range including the voltage value at which the low-speed response area occurs).

That is, in the present embodiment, for example, if it is determined that the liquid crystal display device 1 satisfies the first mode drive condition when driving in the second mode, the operation mode of the liquid crystal display device 1 can be switched from the second mode to the first mode.

If it is determined that the liquid crystal display device 1 satisfies the first mode drive condition when driving in the first mode, the liquid crystal display device 1 continues driving in the first mode.

In contrast, if it is determined that the operation or state of the liquid crystal display device 1 does not satisfy the first mode drive condition (NO in step S1), the operation mode setting circuit 102 sets the second mode as the operation mode of the liquid crystal display device 1 (step S4). In this case, for example, a range from 0V to 6V is set as the range of the voltage applied to the first electrode E1.

If the second mode is set as the operation mode of the liquid crystal display device 1, the display controller 103 drives the liquid crystal display device 1 in the second mode (step S5). In this mode, the display controller 103 displays the video (image) by, for example, applying to the first electrode E1 the voltage corresponding to the video signal output from the control module 5, within the range of the voltage set in step S4 (i.e., the range of the voltage value at which the low-speed response area does not occur).

That is, in the present embodiment, for example, if it is determined that the liquid crystal display device 1 does not satisfy the first mode drive condition when driving in the first mode, the operation mode of the liquid crystal display device 1 can be switched from the first mode to the second mode.

If it is determined that the liquid crystal display device 1 does not satisfy the first mode drive condition when driving in the second mode, the liquid crystal display device 1 continues driving in the second mode.

Next, the above first mode drive condition will be described in detail. If the frame frequency (refresh rate) in displaying the video in the liquid crystal display device 1 is high, the number of images displayed per unit time (i.e., the frame number rewritten in the unit time) is increased. In this case, the response speed needs to be made higher in the liquid crystal display device 1.

For this reason, the first mode drive condition includes, for example, the condition that the frame frequency is lower than a predetermined value. According to the first mode drive condition, if the frame frequency is lower than the predetermined value, the liquid crystal display device 1 can be driven in the first mode to improve the transmittance since the response speed does not need to be made higher. In contrast, if the frame frequency is higher than the predetermined value, the liquid crystal display device 1 can be driven in the second mode to make the response speed higher.

That is, if the first mode drive condition is applied, the frame frequency in the liquid crystal display device 1 driving in the first mode (i.e., the frame frequency in the first mode) becomes lower than the frame frequency in the liquid crystal display device 1 driving in the second mode (i.e., the frame frequency in the second mode).

The first mode drive condition has been explained as the condition that the frame frequency is lower than a predetermined value, but the first mode drive condition may be the other condition.

More specifically, for example, if the transmittance of the liquid crystal display device 1 is low in an environment that the illumination of external light is high, visibility of the video displayed on the liquid crystal display device 1 may be degraded due to an influence of the external light.

Figure 26:
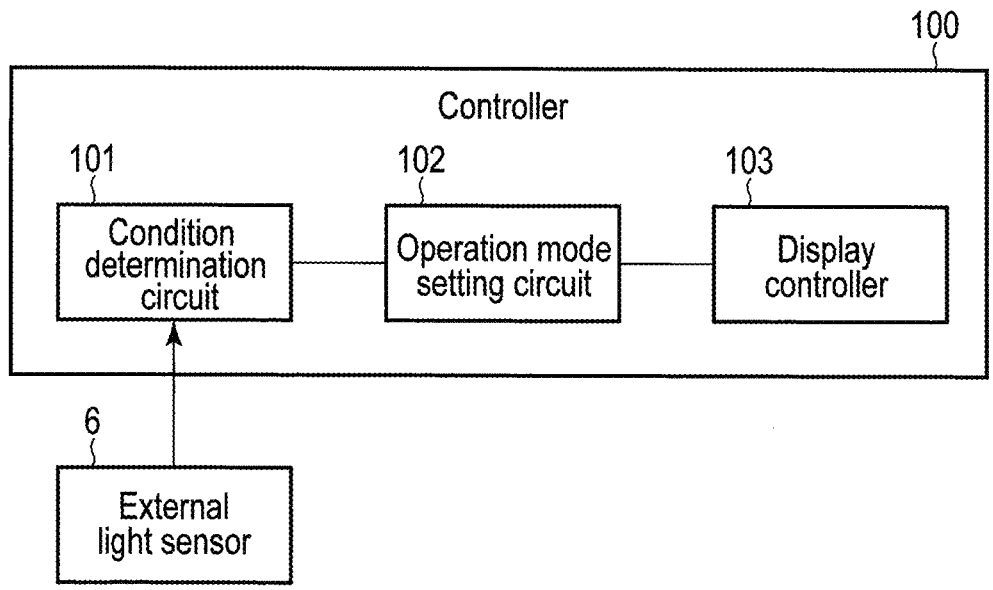
FIG. 26 is a block diagram showing a configuration of a liquid crystal display device including an external light sensor.

For this reason, if the liquid crystal display device 1 includes an external light sensor 6 for detecting (measuring) the illumination of the external light as shown in FIG. 26, the first mode drive condition may be a condition that the illumination of the external light detected by the external light sensor 6 exceeds a predetermined value. In this case, the condition determination circuit 101 determines whether to satisfy the first mode drive condition or not, based on the detection result of the external light sensor 6.

More specifically, according to the first mode drive condition, if the illumination of the external light exceeds the predetermined value, the liquid crystal display device 1 can be driven in the first mode to reduce the degradation of the visibility to the video (i.e., to improve the transmittance). In contrast, if the illumination of the external light is lower than or equal to the predetermined value, the liquid crystal display device 1 can be driven in the second mode by placing a higher priority on the response speed than on the transmittance.

Thus, the liquid crystal display device 1 according to the present embodiment may be configured to detect the illumination of the external light and to switch the operation modes (first and second modes) based on the detection result.

In addition, the liquid crystal display device 1 according to the present embodiment may be employed in a head-mounted display HMD for virtual reality (VR). FIG. 27 shows an example of the head-mounted display HMD employing the liquid crystal display device 1.

If the head-mounted display HMD is used, the main body in which the liquid crystal display device 1 is built is mounted on a head HD of a person. The person wearing the head-mounted display HMD can visually recognize the video displayed on the display screen of the liquid crystal display device 1. Since the video (moving image) is visually recognized in a short distance, in the head-mounted display HMD, blur of the moving image needs to be reduced. The high-speed response is therefore required for the liquid crystal display device 1.

If the liquid crystal display device 1 according to the present embodiment is, for example, a smartphone and is configured to be detachable from the head-mounted display HMD (housing) shown in FIG. 27, the first mode drive condition may be a condition that the liquid crystal display device 1 is not mounted on the housing of the head-mounted display HMD which is an external device. In this case, the liquid crystal display device 1 includes a mounting detector 7 which is configured to detect mounting on the external device (housing of the head-mounted display HMD) as shown in FIG. 28 and the condition determination circuit 101 determines whether to satisfy the first mode drive condition or not, based on the detection result of the mounting detector 7. It is assumed that the mounting detector 7 can detect mounting of the liquid crystal display device 1 on the external device by, for example, contact of metal terminals provided on each of the liquid crystal display device 1 and the external device. Mounting the liquid crystal display device 1 on the external device may be detected by the other configuration.

According to the first mode drive condition, if it is detected that the liquid crystal display device 1 is mounted on the housing of the head-mounted display HMD (i.e., the first mode drive condition is not satisfied), the liquid crystal display device 1 can be driven in the second mode to implement the high-speed response required for the VR. In contrast, if it is not detected that the liquid crystal display device 1 is mounted on the housing of the head-mounted display HMD (i.e., the first mode drive condition is satisfied), the liquid crystal display device 1 can be driven in the first mode by placing a high priority on the improvement of the transmittance.

Thus, the liquid crystal display device 1 according to the present embodiment may be configured to detect mounting on the external device and to switch the operation modes (first and second modes) based on the detection result.

The first mode drive condition explained here is a mere example, and the first mode drive condition may be a condition capable of determining that the transmittance needs to be improved in the liquid crystal display device 1 or that the response speed needs to be improved in the liquid crystal display device 1. In addition, a plurality of conditions may be included in the first mode drive condition. In a case where the first mode drive condition includes a plurality of conditions, the liquid crystal display device 1 may be configured to drive in the first mode when satisfying at least one of the conditions or may be configured to drive in the first mode when satisfying all of the conditions.

In addition, in the present embodiment, the operation modes (first and second modes) of the liquid crystal display device 1 are switched under the first mode drive condition, but the operation modes may be switched in accordance with, for example, the user operations for the liquid crystal display device 1, and the like. In this case, for example, if the user determines that the luminance is short when visually recognizing the display screen in the liquid crystal display device 1 driving in the second mode, the user can execute an operation of instructing the liquid crystal display device 1 to drive in the first mode. In contrast, for example, if the user determines that the response speed is short when visually recognizing the display screen in the liquid crystal display device 1 driving in the first mode, the user can execute an operation of instructing the liquid crystal display device 1 to drive in the second mode. According to this, user convenience can be improved since the liquid crystal display device 1 can be driven in the operation mode intended by the user.

In addition, for example, if the operation modes of the liquid crystal display device 1 are switched in response to the user operation, the frame frequency, and the like can be automatically changed in accordance with the operation mode of the liquid crystal display device 1. More specifically, if the operation mode of the liquid crystal display device 1 is switched from the first mode to the second mode in accordance with the user operation, the frame frequency may be improved since the high-speed response can be made. In contrast, if the operation mode of the liquid crystal display device 1 is switched from the second mode to the first mode in accordance with the user operation, the frame frequency may be lowered.

Second Embodiment

Next, a second embodiment will be described. Differences from the above-explained first embodiment will be mainly explained and explanations on the same configuration as those of the first embodiment will be omitted.

In the above-explained first embodiment, the first electrode E1 is the pixel electrode and the second electrode E2 is the common electrode, but the present embodiment is different from the first embodiment with respect to a feature that the first electrode E1 is a common electrode and the second electrode E2 is a pixel electrode.

Figure 29:
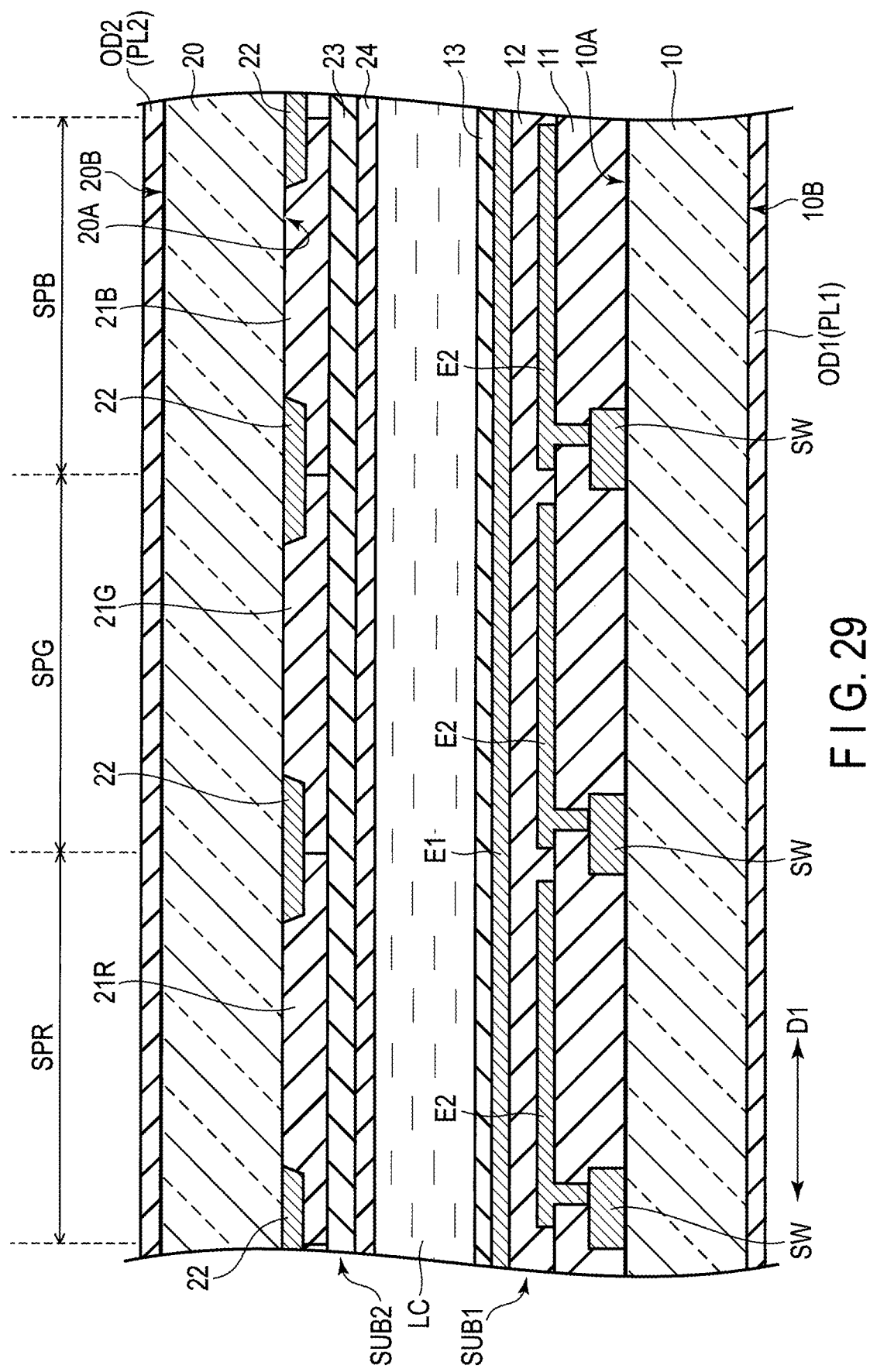
FIG. 29 is a cross-sectional view showing a part of a cross-section of a liquid crystal display device according to a second embodiment.

FIG. 29 shows a part of a cross-section of a liquid crystal display device 1 according to the present embodiment. In FIG. 29, a cross-section of sub-pixels SPR, SPG, and SPB in the first direction D1 is illustrated similarly to FIG. 3. In addition, illustration of scanning signal lines G and video signal lines S is omitted and switching elements SW are simply illustrated in FIG. 29.

In FIG. 29, the first electrode E1 is provided to expand across the sub-pixels SPR, SPG, and SPB. In contrast, the second electrode E2 is provided for each of the sub-pixels SPR, SPG, and SPB. The second electrode E2 is electrically connected to the corresponding switching element SW.

FIG. 30 is a schematic plan view showing the first electrode E1. The view mainly shows an area corresponding to one sub-pixel SP. In the example illustrated, a sub-pixel area A includes a first area A1 and a second area A2, similarly to FIG. 4. In addition, the first area A1 includes the axial area 30 and branch areas 40. In the present embodiment, the first area A1 is an area where the first electrode E1 is not formed (i.e., an area where the common electrode is not disposed), and the second area A2 is an area where the first electrode E1 is formed (i.e., an area where the common electrode is disposed). That is, the first area A1 is a slit (opening) including the axial area 30 and branch areas 40. The second electrode E2 has, for example, an outer shape as represented by a broken line and overlaps the first area A1 in planar view.

The shapes and the like of the axial area 30 and the branch areas 40 are the same as those in the example explained with reference to FIG. 4. In FIG. 30, however, the width of the branch areas 40 in the second direction D2 is larger than that in the example shown in FIG. 4. In the example shown in FIG. 4, for example, the width of the branch area 40 is smaller than the interval between the adjacent branch areas 40, at positions close to the distal parts of the branch areas 40. In contrast, in FIG. 30, the width of the branch area 40 is larger than the interval between the adjacent branch areas 40, at positions close to the distal parts of the branch areas 40.

When an electric field is formed between the first electrode E1 and the second electrode E2, the liquid crystal molecules LM at positions close to first sides 41 and second sides 42 of the branch areas 40 rotate similarly to the example shown in FIG. 6. In other words, the liquid crystal molecules LM between bottom sides 31 to top sides 43 rotate in a first rotational direction R1, at positions close to the first sides 41. In addition, the liquid crystal molecules LM between bottom sides 31 to top sides 43 rotate in a second rotational direction R2, at positions close to the second sides 42. Thus, in the configuration of the present embodiment, too, the high-speed response mode can be implemented similarly to the above-explained first embodiment.

In the present embodiment, too, the first mode (i.e., the mode putting importance on the transmittance) and the second mode (i.e., the mode putting importance on the response speed) can be switched, similarly to the above-explained first embodiment. The present embodiment can therefore achieve the same advantages as those of the first embodiment. Operations concerning the mode switching function of the liquid crystal display device 1 according to the present embodiment are the same as those of the above-explained first embodiment, and detailed explanations are omitted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In addition, in each of the above-explained embodiments, the second direction D2 which is the direction of extension of the axial area 30 is parallel to the video signal lines S, but the second direction D2 may not be parallel to the video signal lines S. For example, the second direction D2 may be parallel to the scanning signal lines G. In this case, the alignment treatment direction AD and the first direction D1 which is the direction of extension of the branch areas 40 may be parallel to, for example, the video signal lines S.

In addition, each of the embodiments discloses the configuration which can be employed when the dielectric anisotropy of the liquid crystal molecules of the liquid crystal layer LC is positive, but the liquid crystal layer LC can be constituted by the liquid crystal molecules having negative dielectric anisotropy. In this case, the alignment treatment direction AD (or the initial alignment direction of the liquid crystal molecules) may be set to a direction orthogonal to the direction of extension of the branch areas 40.

What is claimed is:

1. A liquid crystal display device, comprising:
a first substrate;
a second substrate;
a liquid crystal layer comprising liquid crystal molecules disposed between the first substrate and the second substrate; and
a controller, wherein
the first substrate comprises a pixel electrode, a common electrode and a sub-pixel area including a first area and a second area and first and second video signal lines arranged toward a first side of a first direction, the common electrode being opposed to the pixel electrode, generating an electric field between the common electrode and the pixel electrode, and rotating the liquid crystal molecules,
the second substrate comprises a light-shielding layer overlapping the first and second video signal lines,
the first area comprises an area where the pixel electrode exists,
the second area comprises an area where the pixel electrode does not exist,
the first area comprises an axial area extending in a second direction intersecting the first direction, and branch areas extending from the axial area to the first side of the first direction,
in planar view, the branch areas are located between the first and second video signal lines,
distal parts of the branch areas do not overlap the second video signal line or the light-shielding layer,
in planar view, the second area comprises a first gap area extending in the first direction, at a position between the adjacent branch areas, and a second gap area extending in the second direction, at a position between a distal part of each of the branch areas and the second video signal line,
the controller comprises driving modes including a first mode and a second mode,
a maximum value of a first voltage applied to the pixel electrode in the first mode is higher than a maximum value of a second voltage applied to the pixel electrode in the second mode by 1V or more,
when the first voltage is applied to the pixel electrode in the first mode, the liquid crystal molecules rotate at the first gap area and the second gap area, and
when the second voltage is applied to the pixel electrode in the second mode, the liquid crystal molecules rotate at the first gap area.

2. The liquid crystal display device of claim 1, wherein a frame frequency of the first mode is lower than a frame frequency of the second mode.

3. The liquid crystal display device of claim 1, further comprising:
a sensor detecting illumination of external light, wherein the controller switches the first mode and the second mode, based on a detection result of the sensor.

4. The liquid crystal display device of claim 1, further comprising:
a detector detecting mounting of the liquid crystal display device on an external device,
wherein
the controller switches the first mode and the second mode, based on a detection result of the detector.

5. The liquid crystal display device of claim 4, wherein the detector detecting mounting on a housing of a head-mounted display.

6. The liquid crystal display device of claim 1, wherein in planar view, the axial area overlaps the first video signal line and the light-shielding layer.

7. The liquid crystal display device of claim 1, wherein the controller switches the first mode and the second mode in response to a user operation, and change a frame frequency based on a result of the switching.

8. A liquid crystal display device, comprising:
a first substrate;
a second substrate;
a liquid crystal layer comprising liquid crystal molecules disposed between the first substrate and the second substrate; and
a controller, wherein
the first substrate comprises a pixel electrode, a common electrode, a sub-pixel area including a first area and a second area and first and second video signal lines arranged toward a first side of a first direction, the common electrode being opposed to the pixel electrode, generating an electric field between the common electrode and the pixel electrode, and rotating the liquid crystal molecules,
the first area comprises an area where the common electrode does not exist,
the second area comprises an area where the common electrode exists,
the first area comprises an axial area extending in a second direction intersecting the first direction, and branch areas extending from the axial area to the first side of the first direction,
in planar view, the branch areas are located between the first and second video signal lines,
distal parts of the branch areas do not overlap the second video signal line,
the second area comprises a first gap area extending in the first direction, at a position between the adjacent branch areas, and a second gap area extending in the second direction, at a position between a distal part of each of the branch areas and the second video signal line,
the controller comprises driving modes including a first mode and a second mode,
a maximum value of a first voltage applied to the pixel electrode in the first mode is higher than a maximum value of a second voltage applied to the pixel electrode in the second mode,
when the first voltage is applied to the pixel electrode in the first mode, the liquid crystal molecules rotate at the first gap area and the second gap area, and
when the second voltage is applied to the pixel electrode in the second mode, the liquid crystal molecules rotate at the first gap area.

9. The liquid crystal display device of claim 8, wherein a frame frequency of the first mode is lower than a frame frequency of the second mode.

10. The liquid crystal display device of claim 8, wherein the maximum value of the first voltage is higher than the maximum value of the second voltage by 1V or more.

11. The liquid crystal display device of claim 8, further comprising:
a sensor detecting illumination of external light,
wherein
the controller switches the first mode and the second mode, based on a detection result of the sensor.

12. The liquid crystal display device of claim 8, further comprising:
a detector detecting mounting of the liquid crystal display device on an external device,
wherein
the controller switches the first mode and the second mode, based on a detection result of the detector.

13. The liquid crystal display device of claim 12, wherein the detector detecting mounting on a housing of a head-mounted display.

14. The liquid crystal display device of claim 8, wherein the second substrate comprises a light-shielding layer overlapping the first and second video signal lines, and distal parts of the branch areas do not overlap the second video signal line or the light-shielding layer.

15. The liquid crystal display device of claim 14, wherein in planar view, the axial area overlaps the first video signal line and the light-shielding layer.

16. The liquid crystal display device of claim 8, wherein the controller switches the first mode and the second mode in response to a user operation, and change a frame frequency based on a result of the switching.

* * * * *